Sept. 20, 1966   W. J. SHANAHAN   3,274,333
SCRAMBLED TELEVISION SYSTEM
Filed Oct. 23, 1952   10 Sheets-Sheet 1
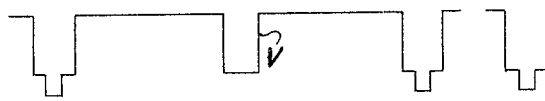
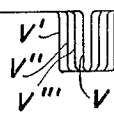
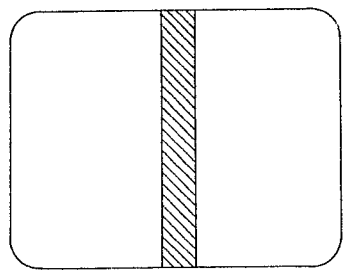
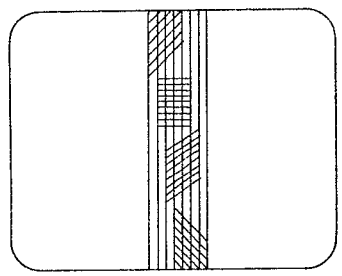
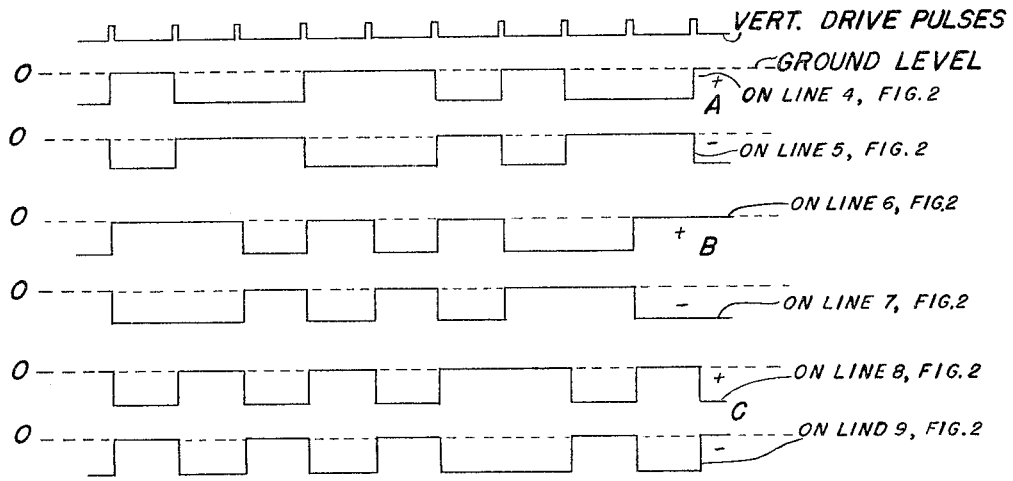
INVENTOR
WILLIAM J. SHANAHAN
BY Cushman, Darby & Cushman
ATTORNEY

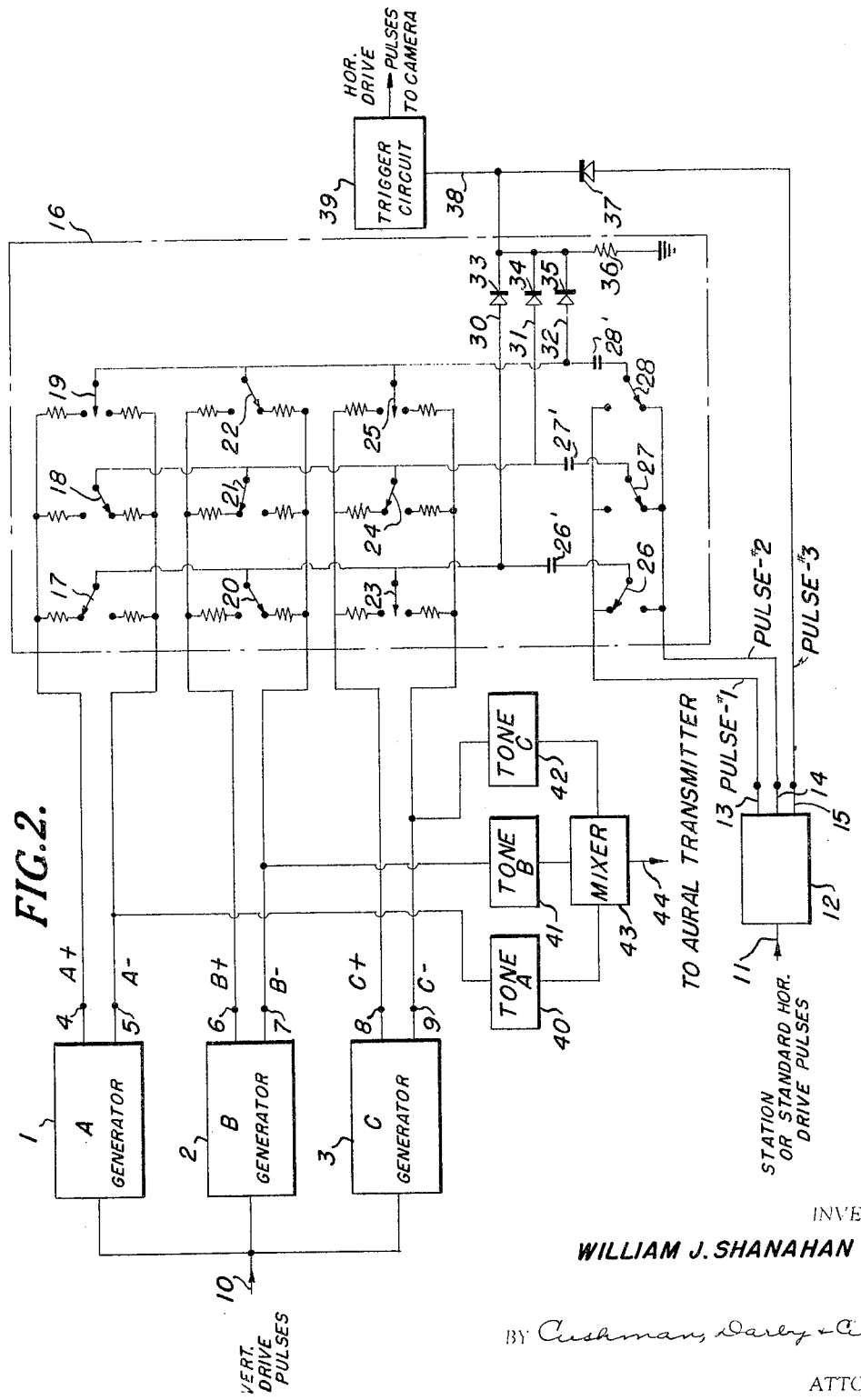

Sept. 20, 1966   W. J. SHANAHAN   3,274,333
SCRAMBLED TELEVISION SYSTEM
Filed Oct. 23, 1952   10 Sheets-Sheet 3
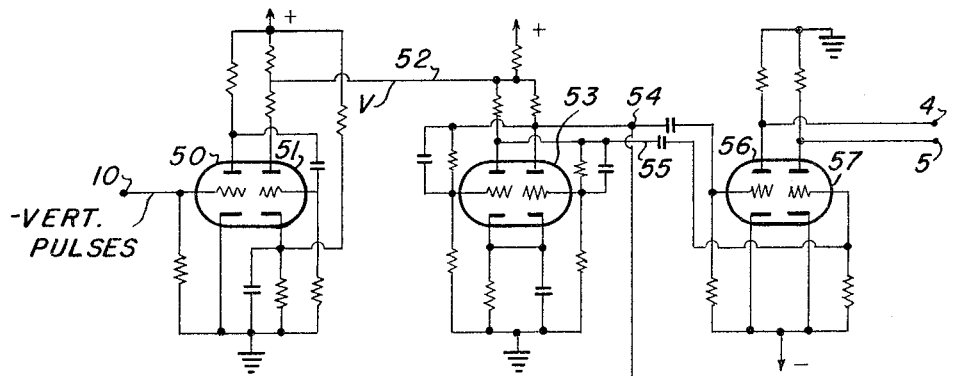
*FIG. 5.*
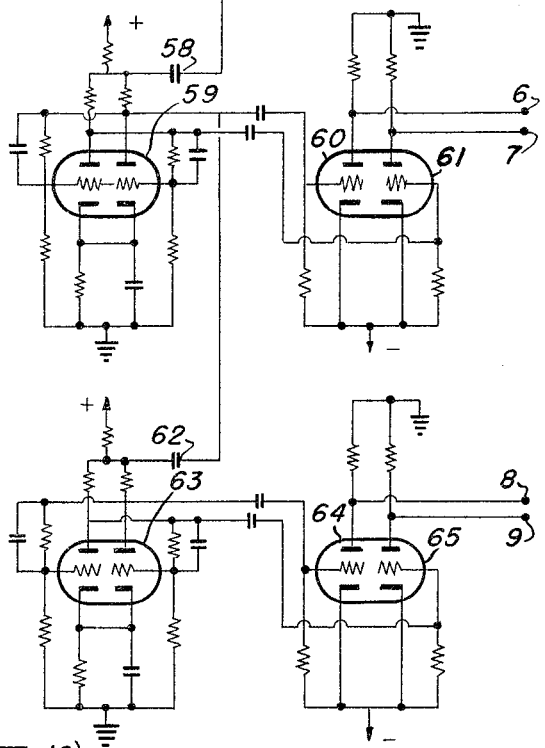
*FIG. 6.*
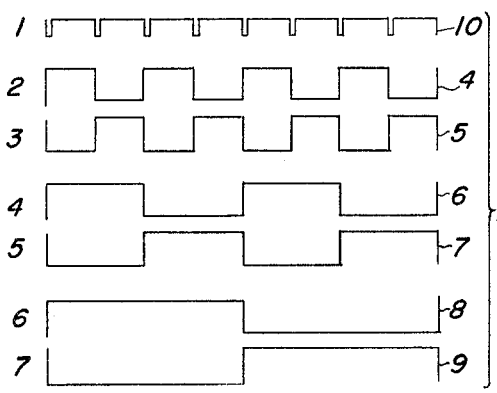
WAVEFORMS
INVENTOR
WILLIAM J. SHANAHAN
BY Cushman, Darby & Cushman
ATTORNEY Sept. 20, 1966   W. J. SHANAHAN   3,274,333
SCRAMBLED TELEVISION SYSTEM
Filed Oct. 23, 1952   10 Sheets-Sheet 4
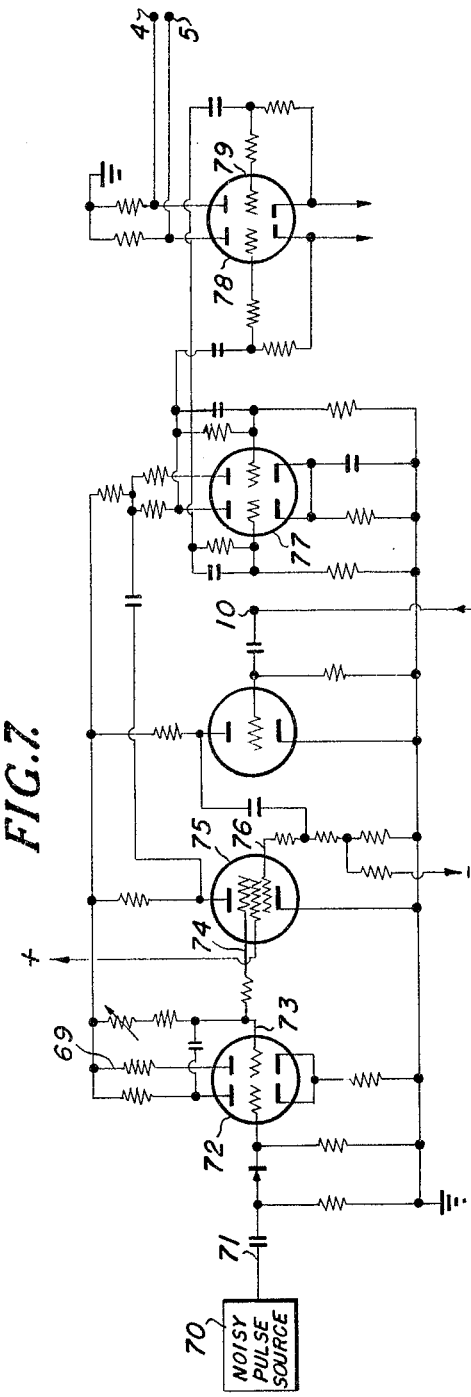
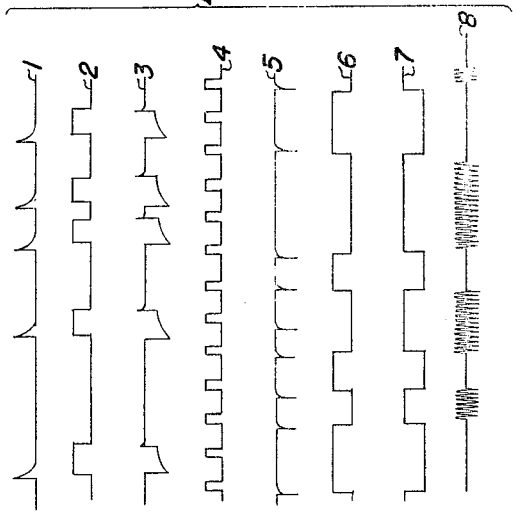
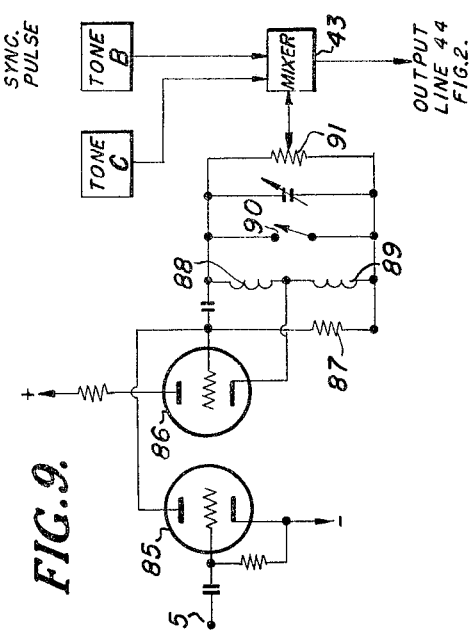
INVENTOR
WILLIAM J. SHANAHAN
ATTORNEY

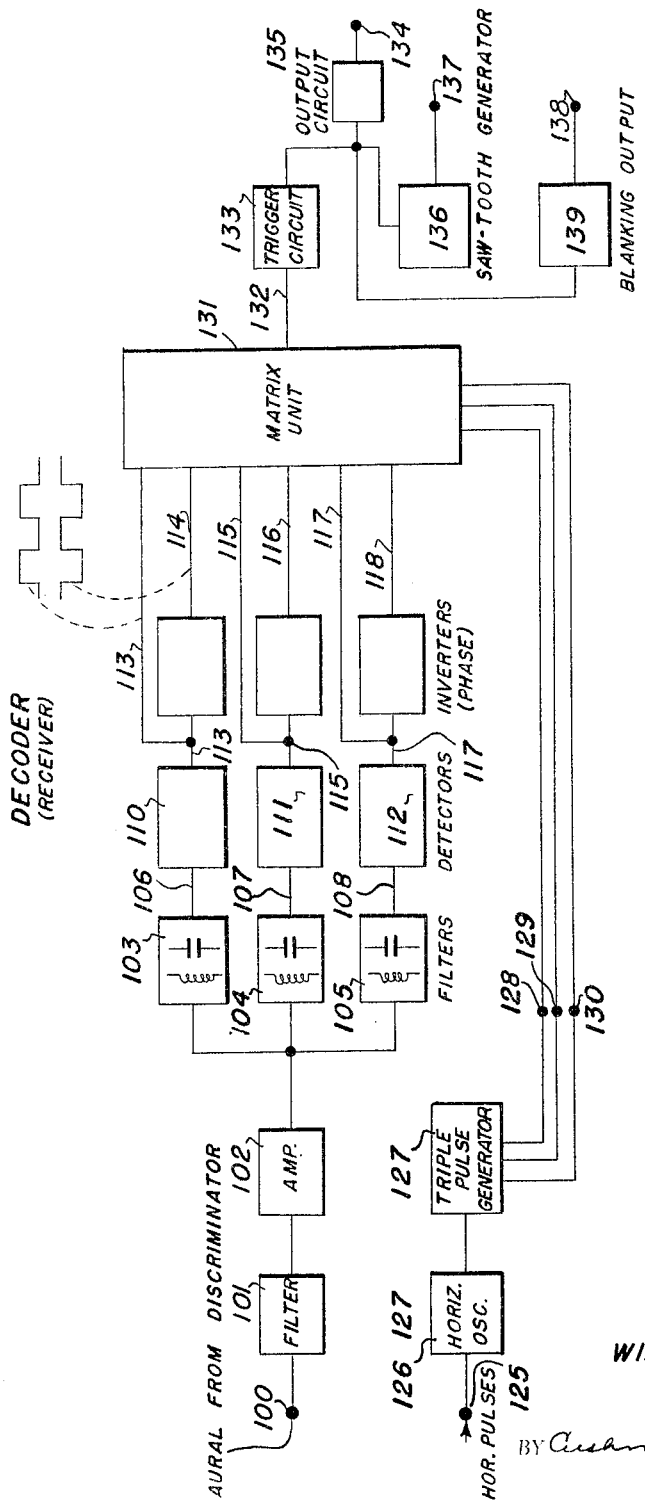

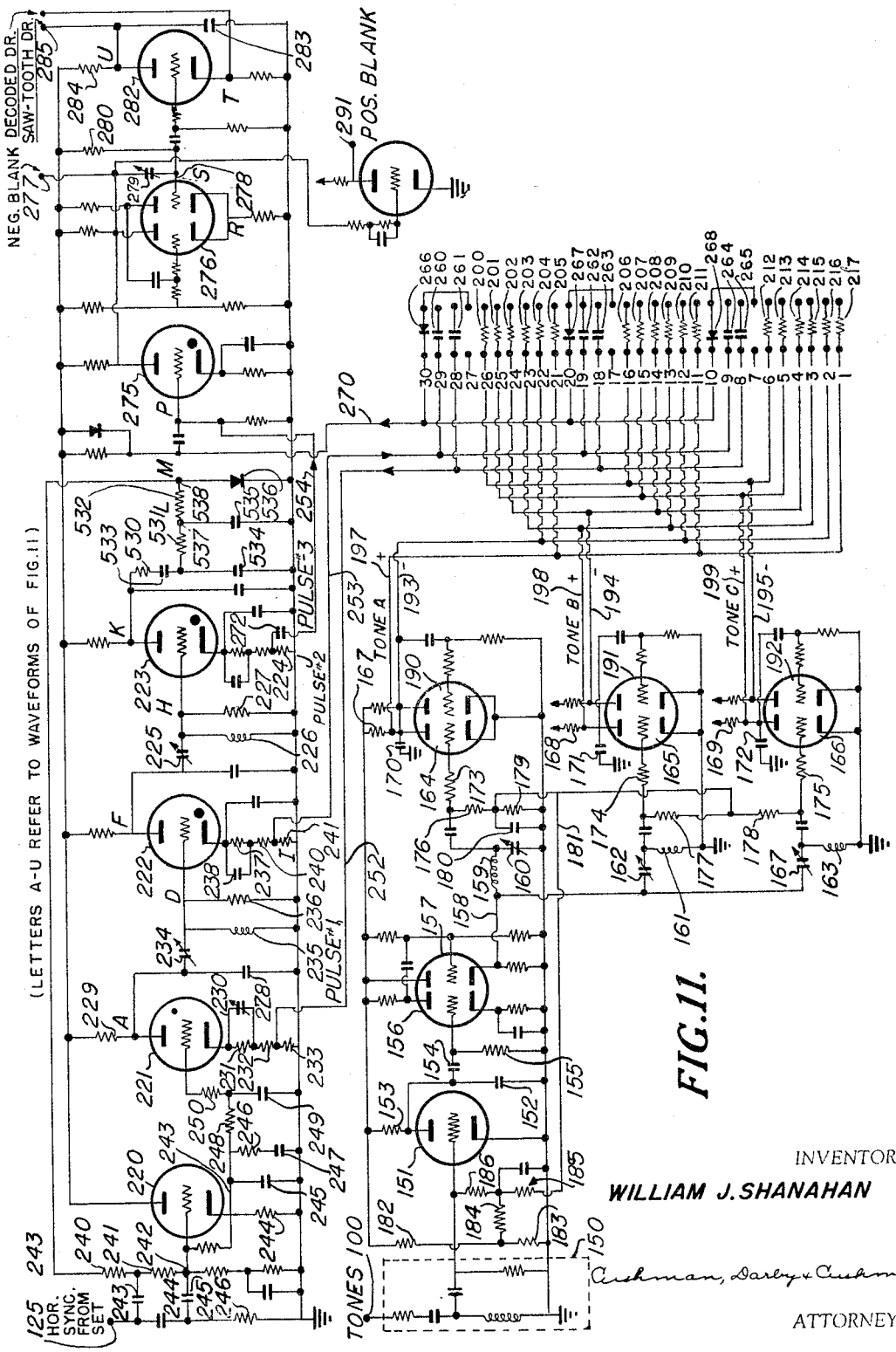

Sept. 20, 1966 W. J. SHANAHAN 3,274,333
SCRAMBLED TELEVISION SYSTEM
Filed Oct. 23, 1952 10 Sheets-Sheet 7

INVENTOR
WILLIAM J. SHANAHAN

BY Cushman, Darby & Cushman
ATTORNEY

INVENTOR
WILLIAM J. SHANAHAN

Sept. 20, 1966 W. J. SHANAHAN 3,274,333
SCRAMBLED TELEVISION SYSTEM
Filed Oct. 23, 1952 10 Sheets-Sheet 9

INVENTOR
WILLIAM J. SHANAHAN

BY Cushman, Darby & Cushman
ATTORNEY

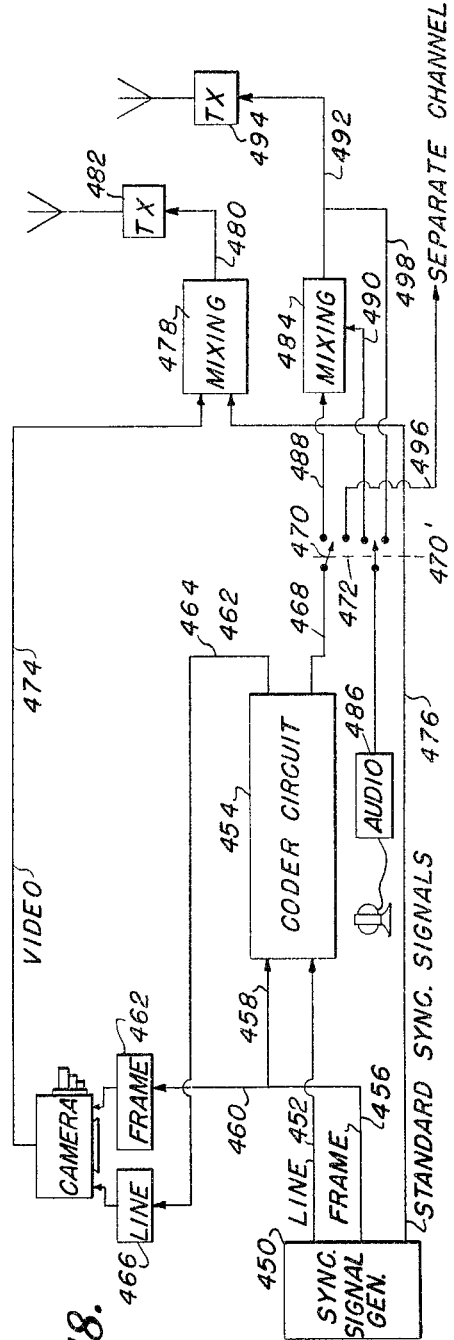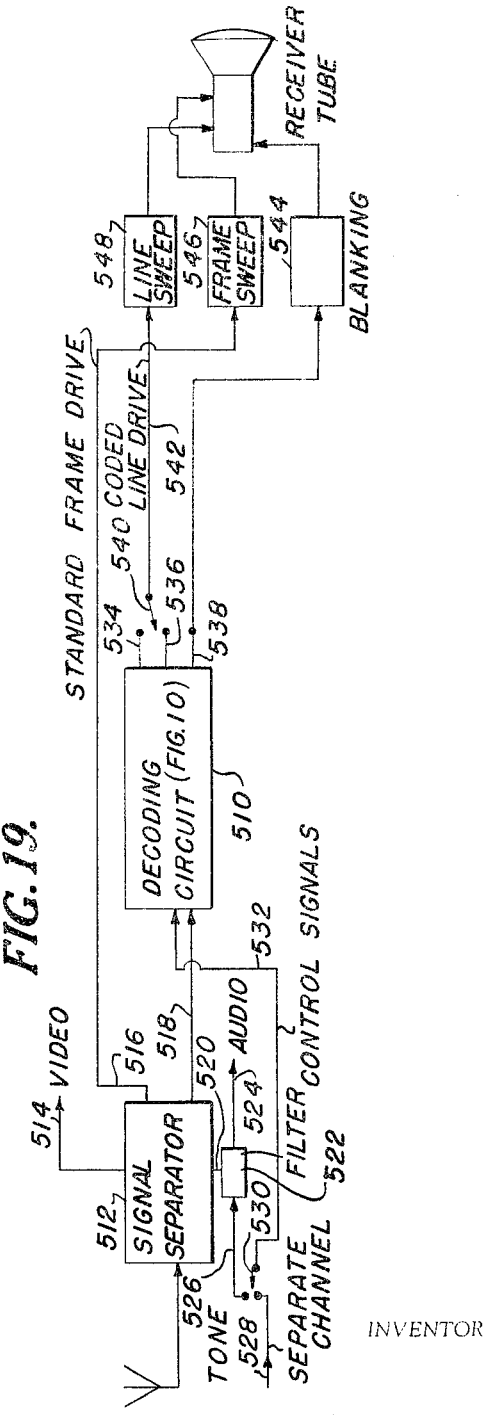
FIG. 18.
FIG. 19.
INVENTOR
WILLIAM J. SHANAHAN
BY Cushman, Darby & Cushman
ATTORNEY 3,274,333
SCRAMBLED TELEVISION SYSTEM
William J. Shanahan, New York, N.Y., assignor to Skiatron Electronics & Television Corporation, New York, N.Y., a corporation of New York
Filed Oct. 23, 1952, Ser. No. 316,485
22 Claims. (Cl. 178—5.1)

This invention relates to the transmission of television signals in a manner calculated to disguise the character of the transmitted signals or to produce annoying flicker or jitter of the image on the receiver tube face, so as to cause interference with the reception of the signal by means of a conventional television receiver, means being provided to authorized subscribers to permit a receiver to be equipped with suitable decoding devices to unscramble or clarify the transmitted signals.

This disclosure constitutes further developments by me in subscriber type television transmission and is intended to further define contributions to this art and to describe additional embodiments of suitable systems and components.

As distinguished from my invention, television systems previously have been described which specifically require the transmission of keying or coding information over an auxiliary communication channel, specifically telephone lines or domestic power lines, in order to provide information by which the television image may be clarified after having been coded at the transmitter. This key signal is to be received by those subscribers who arrange by payment therefor to have a key signal available on the conductors connected to their home television receiver. It is becoming increasingly apparent that the reliance upon the use of telephone lines is not satisfactory, in that it complicates the telephone circuitry, and, therefore, prevents the telephone companies from best conducting their primary service. In addition, there is the disadvantage that a subscriber must have not only a television set but also individual telephone service. Also, the reliance upon domestic power lines for providing the coded information is not well taken, for the reason that there is no necessary selectivity in common electrical distribution systems. That is, the domestic power lines have a great number of service lines proceeding from common transformers, and the power companies at their central stations have no means of selectively controlling the connection of the mains to one service line and not to another.

The present invention, unlike the just-described systems, does not depend for operability upon telephone or domestic power lines. However, as will become clear, the present invention can readily be operated in conjunction with telephone lines or power lines if such should be desired.

Basically, my contribution to the art, as evidenced by the above-mentioned patent applications and the present application, involves the concept of modifying at least a portion of the video signals with respect to at least some of the signals and/or key signals and further providing a changeable device at the television receivers so that a given modification of the video signals with respect to the synchronizing signals will for one setting of the changeable device effect a given reconstruction of the image, while the same modification at another time will provide a different reconstruction. As explained in my earlier copending applications, the changeable element may be, for example, a punched card having a possible array of a great number of apertures, thereby providing, in its most complete form, mainly thousands of different code combinations. Other examples of changeable elements are cards having switching circuits printed thereon, or arranged to operate switching circuits. Also, groups of switches or multiple-position switches may be employed, all as described more fully hereinbelow.

According to the present invention, the preferred technique is to generate so-called standard or station frame and line synchronizing pulses at the transmitting end of the system, and to transmit these standard signals to the receiving end of the system. At the transmitting end of the system means are provided for establishing the above-stated modification of a portion of the video information relative to the standard synchronizing signals. As examples, the video signals produced by the transmitters cameras may be inverted before being transmitted, the standard line drive pulses may be delayed for various amounts before being applied to the cameras, the standard frame synchronizing signals may be delayed by various amounts before being applied to the cameras, the video gain may be changed or video polarity reversed. In any case, the video signals being transmitted bear a particular relation to the synchronizing signals, and this relationship is not detectable in an unauthorized receiver. Stated another way, the rasters are developed under control of the sweep driving signals, and these rasters are selectively modified. Therefore, the unauthorized receiver, in attempting to lock in on the transmitted standard synchronizing signals, will produce a distored image because the irregularities introduced at the transmitter have not been compensated for at the receiver. However, authorized receivers will be equipped with circuits and devices controlled by the standard synchronizing signals for introducing irregularities corresponding to those at the transmitter and undistorted images thus may be reconstructed.

The embodiments of my invention disclosed in the present application are to be primarily distinguished from the prior art and my earlier above-cited applications in that the code is not necessarily repetitive in nature, and there is no requirement for a memory, so to speak, for keeping the decoding apparatus at the receiver synchronized with the coding apparatus at the transmitter.

It is a primary object of my invention to provide a method and system and components thereof for coded television transmission wherein a characteristic of the television image is caused to vary in an annoying fashion, so that it cannot be intelligently and/or comfortably viewed, and in which sufficient information for clarification or cancellation of the variations to reconstitute the image is provided to the receiver for operating decoding apparatus for so reconstituting the image.

It is a further object of the invention in accordance with the preceding object to convey the clarification or cancellation information to the receiver as an auxiliary modulation on the transmitted signal or on another line.

It is a still further object of this invention, in accordance with the above objects, to further cause the clarification or cancellation information to be in the form of two or more tones or the like which may be caused to control the decoding apparatus at the receiver, either by means of on-off combinations of the tones or a characteristic of a tone such as frequency or amplitude.

It is still another object of this invention to provide methods and a system and components therefor wherein decoding may be accomplished only if the receiver containing the appropriate decoding means utilizes a changeable device, such as a control card or array of switches, so that information may be set therein as to the relation between the decoding signals and the characteristics of the video signals. Where a card is used, this may have holes, slots, serrations, or other mechanical markings and/or it may have electrically conductive structure upon its face or internally, such as electrically conducting printed circuits and the like. Where switches are employed, it is contemplated that the owner of the receiver will be advised in advance of the proper switch settings for a particular program.

It is a still further object of the invention to provide decoding devices which are adaptable to a wide variety of television receivers currently in existence, and which may be used to convert such receivers for reception of coded television signals.

It is still a further object of the invention to describe methods and apparatus for coding a television transmission in a manner calculated to produce an annoying flicker and to simultaneously generate the appropriate coding signals necessary for decoding the picture at the receiving end of the system.

It is a still further object of the invention to provide methods and apparatus wherein it is possible to employ a master decoding card or other changeable device which is capable of decoding more than one code being transmitted, while other decoding cards or other settings of the changeable device may be arranged specifically for operation on certain individual codes but not on others.

Further objects and the entire scope of the invention will be in part pointed out in detail and in part obvious, in the following specification and claims.

As indicated above, it is the broad concept of the present invention that a characteristic of the television image shall be varied from time to time, such as from field to field or at some other convenient rate, so as to produce an annoying variation in the characteristics of the received image. The characteristics may be the horizontal position of the picture with respect to the raster, the vertical position of the picture with respect to the raster, the polarity of transmission, etc. Whatever characteristic is varied assumes two or more discrete positions or conditions. Thus, in the system utilizing the variation of the horizontal or line position two or more specific time delay relationships shall exist between the video in any horizontal line throughout the line and the horizontal or line synchronizing pulses.

In order to convey the information specifying the mode of transmission for any particular field, an additional degree of modulation is incorporated at the television transmitter. This modulation produces a coded key signal which contains information determining the condition of reception. The code, or relation, between the condition of reception and the characteristics of the signals transmitted is changed periodically so as to prevent unauthorized reception of the television signals. Suitable changeable elements or devices may take the form of a card or key containing perforation, slots, conducting ink, or the like, as above-stated, by which it is possible to produce electrical contact in the decoding equipment, thus establishing the correct code at the receiver, and arrays of switch contacts may also serve the purpose.

Particular exemplary embodiments of the invention will now be described in detail, but without limitation thereto. These embodiments may be best understood with reference to the accompanying drawings, wherein:

FIGURE 1a shows a representative voltage trace in an uncoded television transmission.

FIGURE 1b shows a representation of the trace of FIGURE 1a on a television receiver screen.

FIGURE 1c shows a voltage trace of a television transmission coded according to the present invention.

FIGURE 1d shows a representation of the trace of FIGURE 1c on a television receiver screen.

FIGURE 2 shows a suitable coding circuit for coding horizontal drive pulses for a television camera system in accordance with the present invention.

FIGURE 3 shows a chart of waveforms generated in the circuit of FIGURE 2.

FIGURE 4 shows additional waveforms generated in the circuit of FIGURE 2.

FIGURE 5 shows in detail square wave generating circuits for use in the circuit of FIGURE 2.

FIGURE 6 shows a chart of waveforms generated in FIGURE 5.

FIGURE 7 shows a circuit for generating randomly occurring square waves.

FIGURE 8 shows a chart of waveforms generated in FIGURE 7.

FIGURE 9 shows suitable circuits for generating tones for use in the invention.

FIGURE 10 shows a suitable decoding circuit according to the present invention for use at a television receiver.

FIGURE 11 shows a schematic diagram of the circuit of FIGURE 10.

FIGURE 18 shows in block diagram form the essential portions of a complete television transmitter system according to the present invention, and FIGURE 19 shows a complete television receiver according to the present invention.

Figure 12:
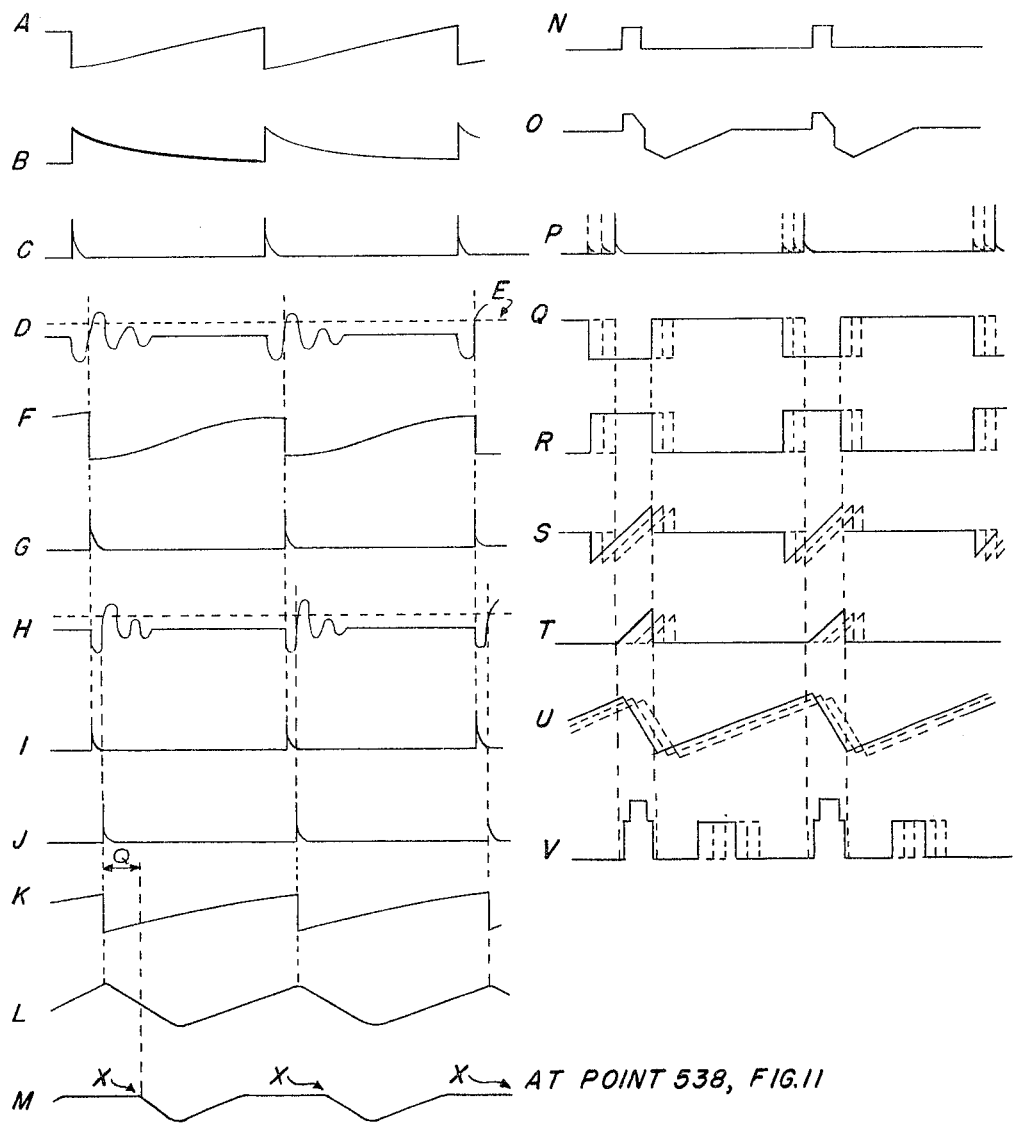
FIGURE 12 shows a chart of waveforms generated in the circuit of FIGURE 11.

In the embodiment first to be described the relation between the horizontal synchronizing pulses and horizontal video information may be continually shifted back and forth at a random and irregular rate. Referring to FIGURE 1a, a video waveform V corresponding to a vertical black bar, is shown. This figure is an oscilloscopic presentation of the waveform transmitted by ordinary means of transmission and synchronization as will be well understood by those skilled in the art. Below the video waveform is shown in FIGURE 1b the corresponding picture as it would appear on the cathode-ray tube of a conventional television receiver.

In FIGURE 1c there is shown the same picture transmitted by means of a system of subscription television as described according to the instant embodiment of the present invention. The video waveform shows that on successive fields the video is shifted back and forth with respect to the synchronizing pulses, so that it occupies a plurality of relationships V, V', V", V''' with respect thereto. The diagram below in FIGURE 1d indicates the appearance of such a picture on the face of a cathode-ray tube.

It is apparent from these diagrams that shifting the relation between horizontal synchronizing and video information will produce an annoying picture upon the face of the cathode-ray tube which is unpleasant to watch for long periods of time. In FIGURES 1c and 1d the various pictures may be delayed with respect to one another by a fixed time interval which may be of the order two microseconds. Thus, if four horizontal pulse positions are employed, the total time displacement will be six microseconds. However, the intervals may be varied.

Using the system of horizontal pulse delay, it is possible to define a number of states corresponding to the number of possible horizontal images. For example, if three horizontal pulse positions are assumed, then the numbers 1, 2 and 3 may be used to represent, respectively, (1) video information at a fixed delay $t$ with respect to the synchronizing pulses, (2) video information delayed by an amount $t'$ greater than $t$, and (3) video delayed from the synchronizing pulse by an amount $t''$ greater than the delay $t'$. The time delays $t'$ and $t''$ may be equal, or may have different values. For convenience, it is assumed that they will both be equal to $t$.

The coding process in the instant embodiment comprises the transmission to the receiver of a code number which will specify which of the conditions of reception will prevail during a particular interval such as a field interval. This may be accomplished by the transmission of a number in binary form, for example, by on-off control of a type of modulation.

In this system a number of square waves may be transmitted via additional modulation on the picture and sound carriers. Preferably, each of these square waves will begin and end during a vertical blanking period so that the code number may change only during vertical blanking intervals. These square waves may be transmitted by any system of modulation on the carrier which, after demodulation, will produce adequate rise time in the square waves.

Another method may include the pulsing on and off of one or more auxiliary pulses included in the horizontal blanking interval. Still another method is to transmit the square wave information by means of the presence or absence of a single pulse or group of pulses during the vertical blanking interval immediately preceding the field. In this case, some means of generating a square wave from the pulse will be necessary in the decoder. Still another method and one which now seems preferable, is the transmission of modulated tones as aural or supersonic subcarriers, on a radiation channel, such as the sound channel, or perhaps over a wire line. These tones might be, for example, at 20, 30 and 40 kc. These tones may be pulsed on and off although not necessarily so, so that they will always stop and start during a vertical synch pulse interval. Alternate means of modulation of the tones are frequency modulation, frequency shift modulation, or partial amplitude modulation (less than 100%). In general, these tones would be switchable between two or more discrete conditions.

If $n$ channels are made available for the transmission of uniquely identifiable square waves, then it is possible to transmit by on-off conditions up to $2^n$, binary numbers. For example, assuming three supersonic carriers of 20, 30 and 40 kc., which will hereinafter be referred to as A, B and C, it is possible to produce eight individual auxiliary coding numbers. These are representable by the following table:

*Table No. 1*

| Code Number | Tone A | Tone B | Tone C |
|---|---|---|---|
| 1 | Off | Off | Off |
| 2 | Off | Off | On |
| 3 | Off | On | Off |
| 4 | Off | On | On |
| 5 | On | Off | Off |
| 6 | On | Off | On |
| 7 | On | On | Off |
| 8 | On | On | On |

The coding process may consist of the creation of a table indicating the relationship between the code numbers 1 to 8, and pulse position numbers 1 to 3 of the type which have been described earlier. For example, a typical code might be written as follows:

*Table No. 2*

| Code numbers: | Pulse position |
|---|---|
| 1 | 2 |
| 2 | 2 |
| 3 | 2 |
| 4 | 2 |
| 5 | 1 |
| 6 | 1 |
| 7 | 3 |
| 8 | 3 |

FIGURE 2 shows a diagram of a coding generator for use at a transmitter. Blocks 1, 2 and 3 represent conventional circuits or mechanical devices which produce the commutating wave. These wave signals are preferably square waves which have either a positive or a negative polarity at any instant, but will take on no other values in between. Each generator, A, B and C, has two outputs with respect to ground. These square wave lines are labeled A+ and A—, respectively, B+ and B—, C+ and C—. Thus, the wave at point 5 is the inverse of the wave at point 4. The same holds for the waves on lines 6 and 7 and on lines 8 and 9. As is shown in FIGURE 3, which contains waveforms of the square waves referred to, the circuitry in blocks 1, 2 and 3 is such that transition between upper and lower states takes place only at the time of arrival of vertical driving pulses, which arrive on wire 10, feeding blocks 1, 2 and 3. Lines 4, 5, 6, 7, 8 and 9 now contain potentials which may be combined by parallel gates, a diode matrix, resistance matrix or other gating or selection circuits, to select horizontal pulses.

The generation of horizontal pulses is performed in a multiple pulse generator 12, which produces three pulses on wires 13, 14 and 15, which are delayed in time with respect to one another. Standard horizontal pulses on line 11 from the station synchronizing generator are applied as the input to circuit 12. This is shown in FIGURE 4, on a greatly expanded horizontal scale. The delays will produce stagger of the video substantially as in FIGURE 1c. The delays between the successive pulses may be obtained by any of a wide number of conventional delay circuits, one of which will be described hereinbelow in the preferred embodiment of the decoder. Pulses 1, 2 and 3, being generated and fed into lines 13, 14 and 15, are now ready to be selected by means of a resistor matrix or other circuit by means of the square waves on lines 4 to 9.

A typical matrix circuit is shown in FIGURE 2 in block 16. This circuit is only one way in which the selection process may take place, and no limitation thereto is intended. Within block 16 are shown 12 switches, each of which may be of the single pole, double throw type, with an off position in the center. Thus each of the switches shown may be thrown upwards or downwards, or may be allowed to remain in its rest position, or "off." Of the switches 17 to 28, switches 17 to 25 are used for the gating and addition of square waves, while switches 26 to 28 are for the selection of pulses. It is assumed that each of the square waves feeding in on lines 4 to 9, is clamped with respect to ground, for purposes of discussion, i.e., that each square wave, when at its positive excursion, is at ground potential, and when negative is at a potential of roughly, —100 volts.

Operation of the switches is as follows: In any one vertical column of switches such as 17, 20, 23 and 26, some combination of switch positions is chosen. For example, 17 is shown thrown upward, 20 is shown downward, while 23 is open. 26 is connected upwards to wire 13, carrying pulse number 1. In the other columns, switch 18 is thrown downward, and switches 21 and 24 are thrown upwards, in conjunction with switch 27, which is thrown downward. Finally, in the third column, switch 22 only is thrown downward, in conjunction with switch 28 which is also thrown downward. The condensers 26', 27' and 28', which are shown connected to switches 26, 27 and 28, are of very small capacity and so act only to couple pulses 1 and 2 on to leads 30, 31 and 32, and to crystals 33, 34 and 35, and do not appreciably affect the D.C. voltages present on these leads.

If lines 4 and 7 are both momentarily at ground level, i.e., at the positive maximum of the square wave excursion, then the voltage on line 30, which is essentially the average of these two voltages, will be at ground. However, if either voltage is negative, then line 30 will be negative by at least half the total swing. If both lines go negative, then line 30 will have a potential equal to the total negative potential, which is the maximum excursion of the square waves. Because of these potentials, line 30 is sometimes at approximately ground potential, and sometimes at a negative potential.

When it is at ground potential, crystal 33 will, therefore, be conductive, and positive pulses from line 13 are then conducted through the crystal to the output resistor 36. If a negative potential, however, is present on line 30 by virtue of the fact that one of the contributory square waves is negative momentarily, then crystal 33 will not conduct because of the negative bias on its anode. This negative bias is chosen to be greater than the peak excursion of the pulses 1, 2 and 3.

Referring back to Table 1, it will be noted that it is now possible to correlate code numbers and pulse positions which would be selected by the selector described above. For example, switches 17 and 20 produce an output waveform which selects pulse 1, only when line 4 is positive and line 7 is positive, simultaneously. The convention can be adopted that line 4 will be negative when tone A is off, line 5 will be negative when tone B is on, line 6 is negative when tone A is off, line 7 is negative when tone B is on, line 8 is negative when tone C is off, and line 9 is negative when tone B is on. Thus, the following interpretation may be made:

The condition of lines 4 and 7 being positive corresponds to tone A being on and tone B being off. This corresponds to code numbers 5 and 6 as described in Table 1. Thus, I associate the number one pulse with code numbers 5 and 6. The combination of switches 18, 21 and 24 produce an output positive gating waveform only when lines 5, 6 and 8 are positive. This corresponds to a condition wherein tone A is off, tone B is on, and tone C is on. This condition is satisfied only by code number 4. Therefore, I correlate pulse position 2 with code number 4. In the third column the second pulse is selected only when line 7 is positive. This corresponds to tone B being off. This condition corresponds to a number of possible code numbers, namely 1, 2, 5 and 6. These are represented in the following table:

*Table No. 3*

CODE NUMBER

|  | 1 | 2 | 3 | 4 | 5 | 6 | 7 | 8 |
|---|---|---|---|---|---|---|---|---|
| Pulse No. 1 |  |  |  |  | x | x |  |  |
| Pulse No. 2 | x | x |  | x | x | x |  |  |

Now it will be noted that pulse 1 is, therefore, sometimes selected, pulse 2 is sometimes selected, pulses 1 and 2 are both selected on certain code numbers, such as 5 and 6 and on other code numbers, such as 3, 7 and 8, neither pulse is selected. Note that pulse 3 is fed along line 15, through crystal 37, into output resistor 36. This means that pulse 3 is always present on output lead 38, regardless of the code condition. Line 38 feeds a multivibrator, blocking oscillator or other trigger circuit, represented as 39. The precise manner of driving the camera will be understood by those skilled in the art. This trigger circuit produces a pulse having a width considerably longer than the space between pulses 1, 2 and 3. Therefore, it is triggered on the first pulse received and does not recover in time to trigger on successive pulses. Thus, if pulses 1 and 2 arrive on line 38, trigger circuit 39 will fire only on pulse 1. Therefore, the final output code may be deduced by assuming that for each code number 1 through 8, if a first pulse is selected, this will be the pulse that actuates the output circuit. If there is no first pulse, then the second pulse will actuate the output circuit if it is present. If there is no first or second pulse, then the third pulse will be selected, due to the lack of any pulses selected as a result of the switches.

This system, therefore, selects three pulses, although only pulses 1 and 2 are fed into the switches 26, 27 and 28. This connection also has the advantage that during the time of switchover, trigger action of circuit 39 will never be absent, since if the selector waveform has not built up to the full amplitude required to gate pulse 1 or 2 through its respective crystal, the third pulse will temporarily trigger the output trigger, circuit 39. We may make the following table, therefore, which represents the final output code:

*Table No. 4*

CODE NUMBER

|  | 1 | 2 | 3 | 4 | 5 | 6 | 7 | 8 |
|---|---|---|---|---|---|---|---|---|
| Pulse No. | 2 | 2 | 3 | 2 | 1 | 1 | 3 | 3 |

Now since each number 1 through 8, is a possible code resulting from the combinations of tones A, B and C, being on or off, they will be selected randomly by the combination generating circuits. Therefore, when code Number 2 comes up, for example, the coder circuit described above selects pulse 2 to drive the cameras, etc. In order to transmit the decoding information to the receiver, it is necessary to actuate the tone generating circuit from the square wave selector circuits used to energize the switch matrix. This is done, as shown in FIGURE 2, by feeding the waveform from lines 5, 7 and 9 into tone A, tone B and tone C generators.

In correspondence with the conventions adopted above, tone A is present when line 5 is negative. Thus, line 5 is a gating waveform for tone A, which is produced in box 40. When a negative excursion is produced on line 5, a gate or keyer tube in box 40 is actuated so as to produce a burst of tone A. Similarly, when line 7 is negative, tone B generator 41 is energized, and when line 9 is negative, tone C generator is energized. The combined waveforms from these three circuits are fed into mixer 43 from which line 44 feeds tones to the aural transmitter.

A description of the details of typical square wave generators to produce the voltages on lines 4 to 9 will now be given.

FIGURE 5 shows a simplified schematic diagram of A, B and C square wave gating generator designed to operate using a regular type of switching between codes.

FIGURE 6 shows the waveforms pertaining to FIGURE 5 and the numbers on the diagram refer to the waveforms of the corresponding points in FIGURE 5. It is assumed that negative vertical driving pulses appear on line 10 at field frequency intervals. These pulses are inverted by tube 50 and applied to the grid of tube 51, where they are again amplified and inverted, producing a negative voltage waveform on line 52. This line 52 triggers the trigger circuit or flip-flop 53.

This flip-flop may be of conventional design, such as is commonly known as an Eccles-Jordan circuit comprising a doubly regenerative circuit with conductive connections from each plate to the opposite grid. Trigger tube 53 produces on its plate square waves which are counted down from the frequency of the vertical impulses, that is, the voltage on each plate executes a square wave of half the frequency of the incoming pulses whose steep side are synchronized with the incoming vertical pulses. These square waves are transmitted over lines 54 and 55 to output tubes 56 and 57, where they are amplified and appear on isolated lines 4 and 5. For convenience, the output tubes 56 and 57 may be connected between ground and a source of negative potential so that the voltages on lines 4 and 5 are negative with respect to ground during one-half cycle, and at ground potential for the other half cycle.

In FIGURE 6, lines 2 and 3 show the waveforms on wires 4 and 5. The voltage from one of the plates of trigger circuit 53 is coupled by differentiating condenser 58 to trigger circuit 59, which is of similar construction to 53. This, in turn, produces countdown action in normal fashion, thus producing a square wave of half of the frequency of the waveform appearing on lines 4 and 5 and applies these voltages, in turn, to the grids of output tubes 60 and 61. These waveforms appear on lines 6 and 7 and are shown in the corresponding diagrams of FIGURE 6. One of the square waves is then coupled, in turn, by differentiating condenser 62 to the trigger circuit 63 which functions in similar fashion, again counting down the waveforms at a ratio of 2:1.

These waveforms appear on the plates of output tubes 64 and 65, thus producing the square waves shown as lines 8 and 9. These square waves are generated in a manner described above and are known as "regular sequence coding," since they produce, in turn, by their application to the coding circuits of FIGURE 2, each of the codes mentioned earlier in the text in turn. The waveforms on lines 4 to 9 then are fed to the other selected circuits shown in FIGURE 2. It is to be noted that the device shown in FIGURE 5 is a special circuit which is usable in the particular case when square waves of regular periodicity are desired. A device for generating randomly spaced square waves will be described below.

It is to be noted that without any loss of operation, line groups 4 and 5, 6 and 7, and 8 and 9 may be transposed so as to produce additional code combinations. Thus, for example, lines 4 and 6 may be interchanged and lines 5 and 7 interchanged at the same time. This would merely cause a shift of gating frequencies for the tones A and B, and would produce the corresponding variation in the pulses selected.

Now referring to FIGURE 7, an arrangement for producing a randomly varying square wave, such as shown in FIGURE 3, will now be described. Since the generators for square waves A, B and C, are completely independent, but of similar design, only one will be described, and it will be assumed that the same design will apply to all of them.

In order to produce random coding, I begin with a noisy pulse source 70. This noisy pulse source may be a sporadically firing thyratron or a free-running but noise-triggered multivibrator or the like. It may also be the result of partial synchronization of an erratic multivibrator with another erratic source, thus producing a series of pulses which is doubly erratic. These pulses are shown in line 1 of FIGURE 8. The average frequency of the noise source may be adjusted so that it is roughly equal to one-half that of the vertical pulses, although this is not essential.

The pulses on line 71, coming out of source 70, are fed to one-shot multivibrator 72. This multivibrator can be of any standard design, and is adjusted so that it produces a square wave whose width is equal to slightly less than the vertical field interval. Thus, a series of irregularly spaced, but constant width pulses as shown in line 2 of FIGURE 8, is produced at point 69, which is one of the plates of the multivibrator 72. In addition to this, a negative gating waveform is obtained on the grid 73 of tube 72. This is actually the timing waveform for the multivibrator, but will be used for negative gating purposes.

The waveform at this point is shown as line 3 of FIGURE 8. This waveform is supplied to suppressor grid 74 of gating tube 75, which is of a common variety containing two control grids. On the main control grid 76 of tube 75, appear positive vertical pulses supplied from the synchronizing generator. These vertical pulses are derived from tube 80 which inverts negative vertical pulses arriving on line 10.

The positive pulses appearing at grid 76 are shown on line 4 of FIGURE 8. It is apparent that at some times when pulses appear on the grid of tube 75, the suppressor grid will be at ground potential, while at other times the suppressor grid will be driven negative past cut-off by the presence of the waveform shown on line 3. Since these vertical pulses can be made very narrow by differentiation, for example, the result is that the output pulse on the plate of tube 75 may be present or absent, according to whether the suppressor grid happens to be negative or positive at the time. This is shown in line 5 of FIGURE 8, in which an irregularly-spaced group of negative pulses appears on the plate of tube 75, each of which occurs in synchronism with vertical driving pulses, but of which some are missing.

These pulses from the plate of tube 75 are now applied to a flip-flop of the Eccles-Jordan variety, shown as 77. This tube has roughly the same design as the flip-flop used in FIGURE 5 and, therefore, produces a square wave which alternately rises and falls on each of the pulses arriving from the plate of tube 75. The waveforms from the plates of tube 77 are now applied to output tubes 78 and 79, which are similar in design to the output tubes described before, and which produce output waveforms on their plates which are at ground level or below ground level, according to whether the square waves happen to be present or absent. The output leads from tubes 78 and 79 are again designated as 4 and 5, and the square wave on lead 4 is shown in line 6 of FIGURE 8. This square wave fulfills all the requirements of a proper coding wave since it begins and ends in synchronism with vertical field intervals, and is sporadically positive and negative. The waveform on lead 5 is shown on line 7 of FIGURE 8.

A brief description of an exemplary tone generator will now be given. Referring to FIGURE 9, it will be noted that tube 85 is supplied with square waves from line 5. This corresponds to line 5 in FIGURE 2. The cathode of tube 85 is connected to a negative potential and, hence, when tube 85 conducts, it produces a potential drop across resistor 87 in the grid of oscillator tube 86, holding it cut off. When, however, tube 85 is cut off by the presence of a negative square wave on its grid, the D.C. voltage drop across resistor 87 is eliminated and oscillator 86 is allowed to regenerate and thus oscillate at the frequency determined by coils 88 and 89, and condenser 90, connected in its grid and cathode circuit. This waveform appears in line 8, FIGURE 8.

These sine waves which are pulsed on and off in synchronism with the presence or absence of square waves on line 5 are now controlled in amplitude by potentiometer 91 and to be fed into mixer 43. In similar fashion, oscillators pulsed by square waves corresponding to tones B and C, produce the pulsed sine waves which are fed into mixer 43. The output of mixer 43 is then fed to the aural transmitter.

A description will now be given of the decoder attached to a conventional television set for the purpose of unscrambling the pictures which were scrambled in the coding unit. In essence, the decoder is the same as the coder, in that it must generate a series of horizontal driving pulses for television set sweeps which are in synchronism with the horizontal driving pulses for the television camera. The selection process is also automatic and is also to be done on the basis of square wave gating signals.

At the receiver, however, the gating signals are not derived from random keying units, as in the coder, but by the detection of the envelopes of the tones sent out as additional modulation of the audio carrier or by the detection of other forms of additional modulation. After detection, these pulses produce square waves which are essentially identical to the square waves used at the transmitter and, therefore, are capable of a similar selection process.

At the decoder the following operation, therefore, takes place. Referring to FIGURE 10, tones are fed over line 100 from the detector or discriminator used to detect the audio portion of the television signal. These are fed into a filter 101, which removes the audio frequency components of the signal. The remaining signal, which consists almost entirely of tones, is then fed to an amplifier 102, which boosts the signal level up to a sufficiently large voltage. The output of amplifier 102 is fed to three tuned circuits, or bandpass elements, to select these three tones. These are identified as 103, 104 and 105. The output of these tone selectors appears on lines 106, 107 and 108, and consists of the tones as were generated in the original unit. Sufficient selectivity is provided between the filters 103, 104 and 105 so that interference between the tones is kept to a minimum. Once separated, the tones are then detected in detectors 110, 111 and 112.

The waveform from detector A appears on line 113 and it is also fed to phase inverter 120, where it is inverted and the same wave, but of opposite polarity, appears on line 114. Similarly, the negative of wave 115 appears on line 116, the negative of 117 appears on line 118. These square waves appearing on lines 113 to 118, may now be considered to be identical to square waves generated at the coder and appearing on lines 4 to 9 within the limits of fidelity of modulation and detection. These waveforms may, therefore, be combined in a coding matrix similar to that used at the transmitter in order to select the pulses to be applied to the output trigger circuits for creating horizontal driving pulses for the television set.

In order to explain the operation of the detector, a description will now be given of the generation of the horizontal pulses. Horizontal synchronizing pulses from the television set appear on line 125. These pulses are caused to actuate horizontal oscillator 126. This horizontal oscillator may be a free running multivibrator, blocking oscillator or the like, which is synchronized to the horizontal synchronizing pulses, or it may consist of a complete automatic frequency loop such as is conventional on present-day television receivers.

The output of horizontal oscillator 126 is such as to trigger triple pulse generator 127, which has three outputs, 128, 129 and 130, which consist of sharp voltage pulses which are separated in time by the same interval as the pulses in FIGURE 4. These pulses are then fed, together with the square wave, into matrix unit 131, where a selection takes place using the same combination of contact arrangements as was used in the transmitter. A description of the details of this unit and its operation with a changeable card, will be given below.

The output of the matrix unit, containing effective switches and crystals, appears on line 132, where it is used to fire a trigger circuit 133, which, in turn, produces output pulses to be employed in the generation of horizontal sweeps for the television receiver. These output pulses appear on line 134.

For some receivers it is necessary to generate a sawtooth waveform directly to be fed into the set because of the lack of an independent discharge tube which can be fired by the application of a horizontal pulse only. For these receivers, the horizontal sawtooth generator 136 is provided which is a conventional sawtooth generator actuated by pulses from line 134 and which produces a sawtooth output on line 137. Almost all television sets may have their sweeps actuated by the application of one or more of the waveforms on lines 134 and 137. In addition, for most television sets, it may be necessary to obscure the edges of the picture to take care of the picture stagger, and to improve the blanking of the horizontal retrace lines. For this purpose an additional lead 138 is provided. This comes from blanking output tube 139 which, in turn is actuated by square wave from trigger circuit 133. The blanking waveforms appearing on 138 are suitable for application to the grid or cathode of the cathode-ray tube in the television receiver, whichever is not used for the application of video signals, and since it is derived from the same trigger circuit used to produce the output blanking, it will naturally be synchronized with the drive to the set.

To more explicitly describe the operation of the typical embodiment of this system, reference is now made to FIGURE 11, which shows a schematic diagram of a typical decoder unit. Line 100 is connected to the frequency discriminator of the aural section of the television receiver. This feeds into filter 150, consisting of coils and condensers as shown, which discriminates against the voice signals. The filtered signals are then fed into amplifier tube 151, and the amplified signals appear on the plate thereof. The bandwidth of the amplifier is restricted further by condenser 152 which restricts the high frequency range in conjunction with plate resistor 153, and by condenser 154, which restrict the lower frequency range in conjunction with resistor 155.

The signal is then fed into the grid of amplifier 156, where it is again amplified and fed to the grid of cathode follower 157. This cathode follower provides the low impedance output on its cathode lead 158, which feeds tuned circuits consisting of coil 159 and condenser 160, coil 161 and condenser 162, and coil 163 and condenser 162'. Each of these filters is a series tuned circuit wherein the condensers and coils may be chosen to resonate at the frequencies of the individual tones.

The tones are then applied to plate detectors 164, 165 and 166. These are sharp cutoff triodes having large resistors 167, 168 and 169, and condensers 170, 171 and 172, connected in their plate circuits. Due to the inability of the plates to follow the instantaneous values of the sine waves present in the tones, only the square wave appears on the plate. In order to improve the performance of the detectors, a grid bias system is employed using series resistors 173, 174 and 175, together with grid lead resistors 176, 177 and 178. These grid lead resistors feed to a common resistor 179, which is bypassed by condenser 180.

By suitably proportioning the above-mentioned resistors, it is possible to provide self-bias for all three tubes, which allows the signals to drive the grids into grid current at one end for a good saturation, and yet allow the tube to be cut off over a wide range of voltages of input signals. In order to further improve the stability of the tone separation circuit over a range of voltages, a rudimentary delayed automatic-volume control system is employed, which takes the voltage appearing across the common resistor 179 and feeds it, by means of lead 181, back to the grid of the first amplifier 151. Line 181 feeds negative bias through a resistor delay network, consisting of resistors 182, 183, 184, 185 and 186, which feeds a small amount of positive opposing voltage onto the grid so as to produce a delay action in conventional AVC technique.

The output waveform from the plates of detectors 164, 165 and 166, are applied to inverters 190, 191 and 192, where they produce inverted waveforms on their plates, producing the signals on leads 193, 194 and 195. The output square waves, therefore, appear on pairs of leads 197 and 193, 198 and 194, 199 and 195. The waves on leads 197, 193, 198, 194, 199 and 195, are now applied to resistor matrix consisting of resistors 200 to 217, which will be recognized as the resistor matrix shown in FIGURE 2 rearranged only so far as this illustration is concerned.

Details will now be given of the pulse generating circuits which generate pulses in a manner analogous to those at the coder. In order to improve the immunity of the decoding from error to noise, an automatic frequency control system may be employed, wherein an oscillator in the decoder is compared in phase with the horizontal synchronizing pulses from the synch pulse separator of the television receiver. In this automatic frequency control circuit, consisting of tubes 220, 221, 222 and 223, timing arrangements are also made so that the phase of the pulses generated will be such as to produce proper decoding action.

The basic oscillator for the horizontal pulse generating circuits is tube 221, which may be of the gas-filled variety, commonly known as thyratron. This tube acts as a relaxation oscillator whose frequency is made substantially independent of plate voltage by the use of condenser 228 and resistor 229 in the plate circuit, and condenser 230 and resistor 231 in the cathode circuit, to determine the frequency of oscillation, together with resistors 232 and 233, to limit the output current. This oscillator functions by a periodic charging and discharging of the condensers, according to fairly well established procedures, and waveforms for the operation are shown in FIGURE 12. Line A shows the plate waveform, line B shows the cathode waveform and line C shows the waveform across resistor 233, which is the first output pulse.

In order to produce pulses delayed from the first pulse, time delay circuits which may be of the form shown in FIGURE 11, are used. This time delay circuit consists of condenser 234 and inductor 235, together with damping resistor 236. When the sharp negative waveform from the plate of tube 221 is applied to the series resonant circuit consisting of 234, 235 and 236, a shock excited oscillation is produced which, in turn, produces the waveform shown in FIGURE 12 line D, on the grid of the second pulse generating tube 222. This oscillation persists for a short number of cycles, but is fairly rapidly damped out by the presence of resistor 236. Hence, quiescent conditions are re-established before the occurrence of the next pulse so as to prepare the resonant circuit for the next trigger.

Thyratron 222 is biased by the D.C. voltage generated across resistor 237, which is by-passed with condenser 238, sufficiently far so that it does not conduct at all times. The triggering potential of tube 222 is shown as line E of FIGURE 12. Hence, when the voltage on the grid of 222 exceeds the level of line E, tube 222 is caused to discharge, producing the waveforms shown in lines F, G and H. Line F shows the waveform on the plate of the second tube, line G shows the waveform shown on the cathode of the second tube, and line H shows the waveform applied to the grid of the third thyratron 223.

Note that the waveform on line F is substantially identical to the waveform on line A, but the cathode waveform on line G differs from that on line B due to the fact that the time constant of 237 and 238 is considerably longer than the time constants 231 and 230, since they are intended to produce a relatively fixed bias on tube 222. Pulses on line G appear in attenuated form across resistor 241, and these pulses are shown in line I. In turn, the tube 223 is fired by waveform H in much the same manner as tube 222 was caused to fire by waveform B. The waveform on resistor 224, which couples the third output pulse, is shown in line J.

It will be noted that in FIGURE 12, lines C, I and J, therefore, provide the output pulses which are to be used in the decoding operation. The spacing between the pulses in line C and G can be controlled by varying the frequency of the resonant circuits 234 and 235, while the spacing between the pulses shown in lines I and J may be varied by changing the resonant frequency of resonant circuit consisting of 225, 226 and 227. This may be accomplished by the manual adjustment of the condenser or the inductor.

In order to provide automatic frequency control action, the waveform shown on line K, which is the plate waveform of gas tube 223, is fed through a time delay and clipping circuit consisting of resistors 530, 531, 532 and condensers 533, 534, 535, and crystal diode 536. The waveform on the plate of 223 is thus integrated so that line L shows the waveform at point 537. This waveform is in time with the waveform from line K, but is integrated so has a greater slope to the trailing edge.

Line M of FIGURE 12 shows the waveform as point 538. This is substantially identical to the wave at line L, except that the top has been clipped. The waveform in line M has a sharp break at point X, shown in FIGURE 12, which, it will be noted by reference to the diagram, is delayed from the third pulse by an amount Q. This delay will be explained later.

The waveform on line M of FIGURE 12 is coupled from point 538 over line 243 through resistors 240′ and 241′ to point 242′. At the same time, positive horizontal pulses from the television set are fed through condensers 243, 244 and 245, and resistor 246 to point 242′. 242′ is connected to the grid of tube 220, which is a hard tube and which is used for automatic frequency control purposes. The waveform on the grid of tube 220 is shown on line 0 of FIGURE 12. This waveform is essentially the same waveform as shown in line M, except that it has added to it horizontal pulses that are shown in line N.

These pulses are fed into the grid of tube 220 which is a phase detector and is similar in design to the phase detector portion of well known circuits which are called by the generic term of "pulse width detection AFC." Depending upon the coincidence of pulses shown in line N and the sawteeth shown in line M, a varying D.C. voltage is generated on lead 243′ across the cathode combination consisting of resistor 244′, condenser 245′ and the series combination of resistor 246′ and condenser 247.

The D.C. waveform smoothed by the cathode combination which is also designed to stabilize the automatic frequency network, is applied through resistor 248 and smoothing condenser 249 and grid resistor 250 to the grid of tube 221. Since the constants of tube 221 have been chosen so that the frequency of oscillation will depend upon the D.C. potential upon its grid, the system shown in the diagram and consisting of tubes 220, 221, 222 and 223 is, therefore, an automatic frequency control. By adjusting the capacitor 230 and by controlling other potentials and resistor values, it is possible to make this automatic frequency control lock in on horizontal pulses with the phase roughly as shown in line 0 of FIGURE 12.

The pulses shown in line C, I and J, are now fed over leads 252, 253 and 254, respectively the former two going to contacts of the resistor matrix consisting of the resistors 200 to 217. These feed through condensers 260 to 265. In essence, the voltages applied to the resistors and condensers of this resistor matrix now correspond exactly to the voltages applied to the resistor matrix shown in the coder in block 16 of FIGURE 2. Therefore, if suitable connections can be made, the decoder will select pulses substantially in accordance with the pulses selected at the coder, thereby making it possible to re-establish synchronism. The switching circuit may consist of a series of switches exactly as in the coder, arranged in any well known form, such as toggle switches, multiple position switches, and the like. In addition, for greater convenience, the decoding action will preferably take place when a card or sheet of cardboard, plastic or other insulating material, is inserted between contacts of a mechanical arrangement connected to the resistors and condensers of the resistor matrix.

These contacts may be made by means of electrical contact material which produces continuity of electrical circuits through holes punched in the card or sheet of insulating material, or the contacts may be made as will be described below, by means of a circuit printed upon the surface of the card by techniques known as "printed circuits." This technique involves the deposition of a conductive film of metallic or carbon paint, upon the surface of the card so as to make the proper contact. The details of one such card and contact assmbly will be described below.

The output of the resistor matrix then consists of lead 270 which contains pulses 1 and 2 selected by resistor matrix in conjunction with crystals 266, 267 and 268 in a manner precisely analogous to that at the coding station and lead 254 which contains the third pulse which is coupled in through condenser 272, directly from the output of the third pulse generator. Since the third pulse does not have to be explicitly selected, this is exactly in accordance with the selection scheme at the coder.

On the grid of tube 275 appears the waveform P. This waveform consists of pulses in positions 1, 2 or 3, according to the selection which is taking place in the resistor matrix.

Note that pulses 1 and 2 are shown dotted since they occur only on certain fields, while pulse 3 occurs at all times. The pulses shown in line P are applied to inverter tube 275 where they appear on the plate in inverted form. The pulses on the plate are then coupled over to multivibrator 276. Multivibrator 276 is of the combination cathode coupled and grid coupled variety, and produces distinctive waveforms as shown in lines Q, R and S of FIGURE 12. Line Q represents the waveform of point 277. This is a negative-going square wave whose start is initiated by the presence of a pulse such as that shown on line P. Two of the output pulses shown in line Q are shown dotted, since they appear only on randomly selected fields. For clarity in lines Q, R and S, the first position is shown solid and the other two are shown dotted. However, let it be emphasized that all three positions occur only on randomly selected fields. The waveform on line R shows the voltage on the cathode of the multivibrator tube. This is a positive going wave, which is narrow compared to the duty cycle, and line S shows the waveform on the grid 278. This waveform is produced by the discharge of condenser 279 into resistor 280. Grid 278 is driven negative when the negative waveform on line Q is coupled through condenser 279 to grid 278. Condenser 279 then discharges until it reaches a potential near enough to that of the cathode so that conduction can take place in the right half of tube 276. When conduction takes place, the grid-to-cathode circuit of the righthand tube is suddenly rendered conductive, thus putting a heavy load on the condenser 279 and pulling the voltage on line 278 down to a lower level. Thus, the rather unusual skew sawtooth waveform shown in line S, is generated by the circuit of tube 276.

Line T shows the output of drive tube 282. This has a cathode pulse output which is shown in line T, and consists essentially of the latter half of the rising waveform shown in line S. In addition to the cathode output, a sawtooth output is obtained on the plate of tube 282 due to condenser 283 and resistor 284. This is shown in line U. In lines T and U the same convention as in line S is followed for clarity. The reason for providing two outputs, namely, at the plate and the cathode of tube 282, is to make provision for television sets which require a sawtooth and a pulse type of horizontal driving waveform.

A brief description will now be given of the delays shown in FIGURE 12. Reference is made to line V, which shows the video waveform. Note that the sweeps shown in line U will cause the video shown in line V to stand still, since the sweeps are synchronized with the jitter of the video. The blanking signals, however, present in the video wave will fluctuate at the edges of the picture. In order to obscure the blanking, an additional blanking signal, synchronized with the sweeps must be used. For this purpose, the same waveform shown in line Q is used. This may be fed as negative blanking to the grids of cathode-ray tubes which are cathode-fed. In addition, the same signal is inverted and appears on line 291, for application to the cathode of cathode-ray tubes having grid modulation.

This blanking waveform must start, at all times, before the signal blanking signal, and, end, at all times, after the signal blanking.

Since the blanking waveform starts at the time of the selected pulse, the third pulse must, therefore, start before the blanking signal. This calls for suitable phase-advance networks, and explains the reason for incorporating the delay Q into the AFC circuit.

In order to make sure that the blanking ends after the picture blanking, it is only necessary to adjust the width of the multivibrator pulse, as shown in the diagram. To require as little increase in blanking as possible, the station blanking can be trimmed down to less than RMA width.

The reason for delaying the start of the sweep, as shown in lines T and U, is that, in some sets, the firing of the horizontal oscillator causes flyback pulses which are picked up and mixed with the sync. In order to delay this pickup to a time after the AFC comparator tube 221 is cut off, as shown in line 0, FIGURE 12, the delays are employed.

It will be understood that no limitation is intended to just three different possible line driving pulses. Any number of such pulses are obviously usable.

An exemplary embodiment of a decoding assembly may consist of a series of contacts or connections made through the appropriate points of a resistance matrix, crystal diode matrix, or gating tube matrix involving control grids or suppressors of active tubes. Such matrices per se are well known to those skilled in the art. Any switching arrangement electrically equivalent to the series of switches shown in FIGURE 2 may be used.

One such arrangement is a card and contact assembly involving horizontal and vertical contacts. This is shown schematically in FIGURE 13. In this figure a card contact assembly is shown having vertical connections in the rear of the card, and horizontal connections in the front. Leads corresponding to wires 113 to 118 in FIGURE 10 are connected to the appropriate front contacts which may be in the form of brushes. Rear contacts are shown as a series of springs connected mechanically together, in a vertical line. Of course, any combination which is electrically equivalent to this, may be substituted, so that the vertical strip might, for example, be a solid backing plate, while each of the brushes contains its own spring. Holes are punched in vertical and horizontal columns of the card to make contacts equivalent to those at the transmitter. The card employed for the decoding operation is thus similar in design to the standard punched card tabulating machine cards produced by IBM and Remington-Rand, and, therefore, this design might be advantageously combined with that of the punched card arrangement. The remainder of the card might be employed for other tabulating purposes, such as addressing, billing, etc.

Figure 13:
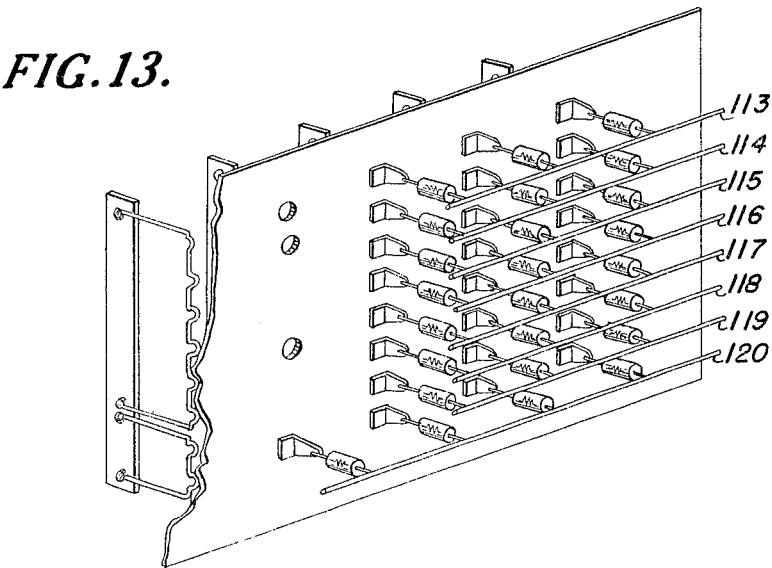
FIGURE 13 shows a matrix switching circuit actuated by a punched control card.
Figures 14A, 14B:
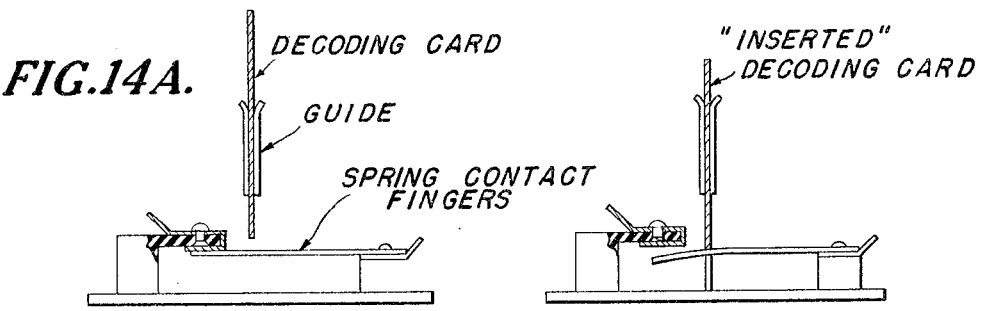
FIGURES 14a–14d show arrangements for employing record cards being cut away along an edge.
Figures 14C, 14D:
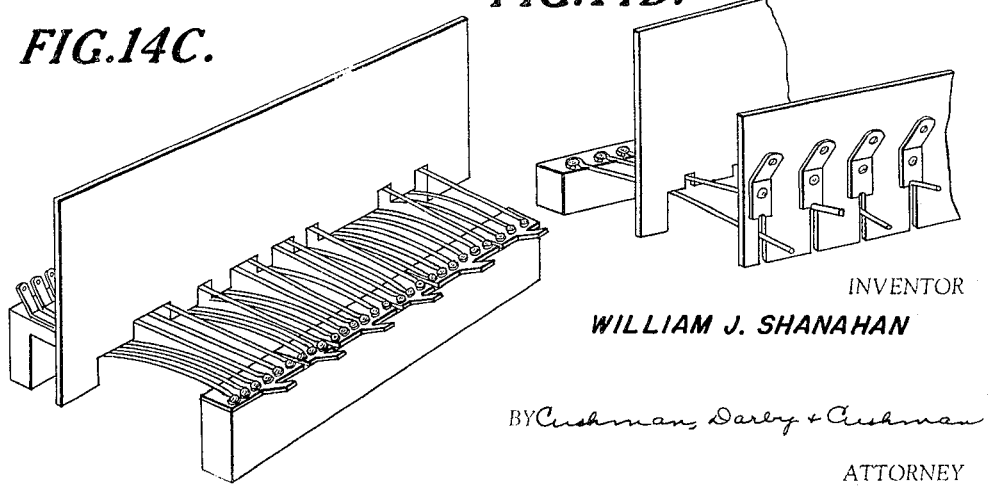

An electrically equivalent arrangement is shown in FIGURE 14a, 14b and 14c. These figures show how a card may be arranged with slots along its edges to open and close contacts of the spring finger variety. These contacts may be made of flat leaf stock, as is shown in FIGURES 14a to 14c, or may be in the form of spring wires as in FIGURE 14d, or may take other configurations. As is shown in FIGURES 14a to 14c, each of the contacts made from the spring is normally closed until the card is inserted into the guide. Two levels of slot depth are chosen, one of which is sufficient to clear the spring contact fingers, while the other causes the contact to open. By inserting the card the requisite amount so that a stop is reached, or so that the edges of the card touch the base plate, a configuration of contacts is set up which is electrically similar to those in FIGURE 13.

Figure 15:
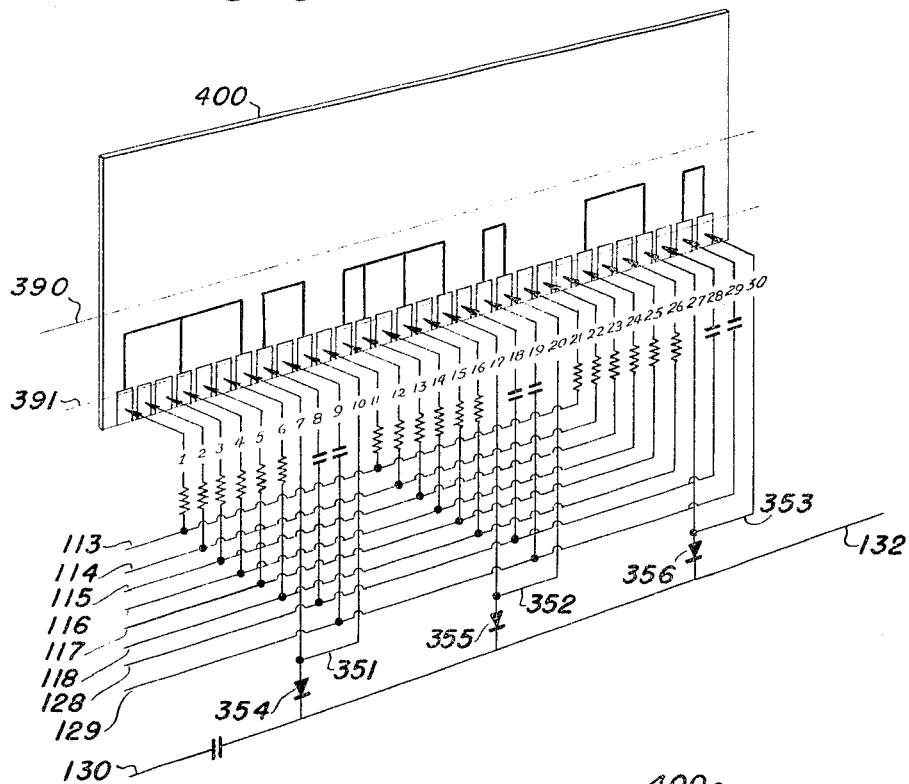
FIGURE 15 shows a switching circuit employing record cards having printed circuits thereon.

Wiring is accomplished in the same fashion in FIGURE 13, except that each of the three vertical rows is laid out horizontally, rather than vertically, so that all contacts form a continuous straight line. A third arrangement which is equivalent to the others, is shown in FIGURE 15. The design in FIGURE 15 incorporates means for making the appropriate contacts by means of electrical printed circuits on the face of the decoder card, the mounting of resistors which form parts of the matrix unit, and the design of a particular type of spring contact assembly.

FIGURE 15 shows in diagrammatic form the configuration of the decoder card using printed circuit techniques. Along the lower edge of the card, or in some other convenient place, are painted a series of stripes of conducting ink, paint or deposited metal. These stripes may be arranged in a horizontal row, as shown in the diagram, or may be arranged in rectangular array, or in other suitable geometrical ways.

These stripes make contact with spring fingers shown diagrammatically in FIGURE 15, by arrow points. All contacts are made on one side of the card if all of the printed circuits are painted on this one side. Therefore, an extra stripe must be provided to be equivalent to the vertical contact shown in FIGURE 13. As an illustration, the card shown in FIGURE 15 contains electrical connections between the various points which is equivalent to the code shown in FIGURE 2. For convenience, each of the contacts has been assigned a number in FIGURE 15, ranging from 1 to 30. These are in groups of 1 to 10, 11 to 20 and 21 to 30.

Contacts 1 to 7, 11 to 17 and 21 to 27 are associated with the resistance matrix. Contacts 8 to 10, 18 to 20 and 28 to 30, are associated with the pulse circuits. In each group of ten, the first six contacts contain resistors and are connected to lines 113 to 118, and are, therefore, equivalent to the front contacts shown in FIGURE 13. Pulses from the pulse generator arrive on lines 128 and 129 and are fed through condensers to contacts 8, 9, 18, 19 and 28, 29. Contacts 7, 10, 17, 20, 27 and 30 are reserved for output connections.

Wiring of the card takes place by drawing or printing a conductive ink line from each of the contacts 1 to 6, corresponding to a closed switch connection, to point 7, etc., as shown in FIGURE 15. Thus, points 7, 17 and 27 contain composite square waves, points 10, 20 and 30 contain the appropriate pulses to be added to these square waves. These signals are mixed and appear on lines 351, 352 and 353 whence they are fed to appropriate diode selectors 354, 355 and 356, and emerge on line 132. The third pulse is fed through line 130 to line 132, where it appears at all times. The contacts are thus made entirely by means of printed circuits on the card.

Figure 16:
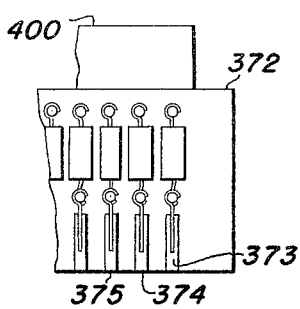
FIGURE 16 shows an elevational view of a structure for use with printed circuit control cards.
Figure 17:
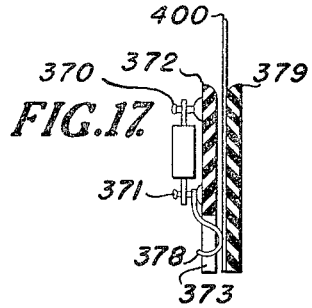
FIGURE 17 shows a cross-sectional view of the structure of FIGURE 16.

By means of this arrangement it is possible to have all contacts on the same side of the decoder card. For convenience, other switching functions which may be actuated upon the insertion of the card, may take place by means of printed circuits, holes or back contacts. A mechanical diagram of a possible contact arrangement is shown in FIGURES 16 and 17. This design combines several features, namely, that of holding the card, holding the contacts, and supporting the series resistors. The supports are made preferably of some insulating material such as Mycalex or phenolic fiber.

Terminal pins, such as 370 and 371, may be used on one side of the board, to support the series resistors, condensers, crystals, etc. These pins are put through board 372, which supports one side of the card. A series of slots 373, 374, 375, etc., are made in the edge of the board 372. These slots are arranged with the same spacing as that between the contacts on the card in FIGURE 15. Through each of the slots a spring contact finger, such as 378, is formed and inserted. These contacts may be made directly to the card. The support board 379 may be used to mount additional resistors, condensers, etc., and is also employed to give firm support to the card. No spring arrangements are necessary to hold the card in the slot, because of the pressure of the springs such as 378, which is in a direction perpendicular to the face of the card, and thus tends to hold the card in the slot, rather than forcing it out.

The contact described above may, of course, be arranged in other ways with alternate springs staggered above one another, or in horizontal rows, vertical rows, etc. The card itself contains a printed circuit applied by painting, spraying, silk-screening or printing press techniques employing conducting ink containing graphite, carbon, silver, copper, etc. For convenience in disguising the characteristics of the code, a heavy black stripe of non-conducting ink may be applied over the series of contacts so as to completely obliterate all of the connections between dotted lines 390 and 391, in FIGURE 15. Thus, all cards will appear the same from the outside. This may be done also by overlaying the card with an additional veneer of thin opaque paper.

For the purposes of further explaining the interconnection of the circuits described above in complete transmitters and receivers, reference is now made to FIGURES 18 and 19. FIGURE 18 shows a complete transmitter wherein the usual standard synchronizing signals are developed in circuit 450 with the horizontal driving pulses applied over line 452 to the coding circuit here designated 454. The vertical driving pulses are applied over line 456 and through branch line 458 to the circuit 454. The circuit 454 is the circuit previously described above in connection with FIGURE 2 and the figures described thereunder. The vertical driving pulses on line 456 are also directly applied over line 460 to the vertical sweep control circuits 462 of the camera 464. Coded horizontal driving pulses appear on line 464 at the output of coder circuit 454 and these pulses are applied to the horizontal sweep control circuits 466 of the camera 464.

The coded tone signals available for transmission to the receiver appear on line 468 and extend to arm 470 of a double pole double throw switch designated generally as 472.

The picture signals on line 474 and standard synchronizing signals on line 476 are mixed in circuit 478 and applied over line 480 to the composite transmitting circuits 482. An additional mixing circuit 484 may be provided for mixing the coded tone signals and the sound signals from the audio system 486. With the switch 472 in its upward position, the coded tone signals will be applied to mixing circuit 484 through switch arm 470 and line 488 and the sound signals through switch arm 470' and line 490. The composite sound and tone signals will then issue over line 492 for application to the aural transmitter 494.

In some instances it may be desired to transmit the tone signals over a separate channel such as a telephone or power line. In that case the switch 472 may be set at its lower position in FIGURE 18 so that the tone signals are applied over line 496 leading to a separate channel and the sound signals applied directly over line 498 to the transmitter 494.

It will be further understood that the video signals, tone signals, standard synchronizing signals and sound signals may be otherwise mixed and transmitted as desired and no limitation is necessarily intended to the arrangement shown in FIGURE 18.

A receiver circuit is shown in FIGURE 19. In this figure the decoding circuit is designated 510 and may be the circuit shown in FIGURE 10 (and in more detail in FIGURE 11) above. The usual signal separator 512 provides the video signals on line 514, the standard vertical driving pulses on line 516, the standard horizontal driving pulses on line 518 and the combined sound and tone signals on line 520. The signals on line 520 are applied to filtering circuit 522 for separating out the audio on line 524 from the tone signals on line 526. In the alternative the tone signals may be incoming over a separate channel such as a telephone line designated 528. A switch 530 is provided for selectively connecting line 532 to either the line 526 or 528. Thus, the tone signals are available for circuit 510 over the input line 532.

The decoder circuit 510 is provided with a first output line 534 for carrying a coded horizontal pulse output, a second line 536 for carrying a coded horizontal sweep output, and a third line 538 for carrying blanking signals, all as described in connection with FIGURES 10 and 11 hereinabove.

Depending upon the particular type of commercial television set employed, it may be desired to apply either the coded pulse output on line 534 or the coded sweep output on line 536 to the receiver circuits. Accordingly, switch 540 is provided for selectively connecting line 542 to the lines 534 and 536.

The receiver is diagrammatically shown to comprise blanking control circuits 544, vertical sweep control circuits 546 and horizontal sweep control circuits 548. The blanking control line 538 is connected to circuit 544, the coded horizontal signals on line 542 are applied to the horizontal sweep control circuits 548 and the standard vertical signals on line 516 are applied to vertical sweep circuits 546.

It will be understood that the above-described circuits are only exemplary and provided simply for purposes of illustration. There will be a wide variety of possible circuits for applying the principles of my invention to various commercial television transmitters and receivers, but it is believed clear that, in view of the foregoing description of the important aspects of my invention, all necessary adaptations to commercial installations will be well understood by those skilled in the art.

Exemplary financial operating procedures for systems according to the invention may be as follows:

A general subscriber will receive a card by mail once a week or once a month, whichever is deemed most practical, and will be billed on a corresponding basis for the use of the card. He will be able to receive all programs transmitted over the system. It is anticipated that the cost for such a service will be materially less than that for any of the other classes of service to be listed below, because of the very low cost of distribution and handling. A card for such purposes may be referred to as a master card.

In addition to the general subscriber, others may subscribe to individual programs, such as a single play or a single championship sporting event, or to groups of programs, such as a series of Saturday evening plays or Thursday evening concerts. By suitable manipulation of the codes these sub-cards may be used concurrently with the master card indicated above. These cards can be sold at newsstands, chain stores, by mail or by vending machines located in public places.

A punched card system can use cards as above-described (printed circuit cards and the like) except that final decoding is accomplished only with the card in place, and by pushing a special lever on top of the decoder. When this lever is pushed, a hole may be made in the decoder card corresponding to the program selected and a portion of the decoding matrix may be connected through contacts made by the punch and die. The decoding takes place partly by virtue of this hole punched in the card. Since the selection may be made immediately before a program goes on the air, this is "pay-as-you-see" operation. The decoder cards using the punched card system may contain additional information in the form of name, address, serial numbers, and various other pertinent bits of factual data concerning the subscriber. After a single week, two weeks or a month of operation for a particular card, a bill may be made up by running the used cards through standard tabulating machines. Advantages of this system are selection of programs immediately before going on the air, low cost of billing, automatic tabulation machine operation and the availability of used decoder cards which can be employed at a later time to make excellent correlations of listener preferences against income level, education, etc.

In the coin-operated system, the decoder card may be mailed out to each subscriber to be inserted in his decoder box at the beginning of the week. By the use of the card which maintains security for the system, the decoding may be restricted to people on an authorized mailing list. Final unlocking of the program may then take place by dropping the appropriate number of coins into specifically allocated slots in the side of the decoder. Prices may be fixed or may be indicated by a series of illuminated lamps on the front panel of the decoder. These lamps would light just before the program goes on the air and would continue to light until the appropriate number of quarters, for example, had been deposited in the slot. At the end of the program the total amount inserted will be collected.

By virtue of the above alternatives, systems, as described above, are capable of great flexibility of operation and are not limited to a single type of collection system. Neither are they encumbered by the cost of telephone lines and sub-station systems or by the inevitable congestion of these lines which would occur were a large number of subscribers to request the same program at the same time on such a system. Since a constantly-changing code card is used, even with coin operation, the security of the system may be readily maintained, which cannot be accomplished with coin operation alone. The cost of operation and collection is thus lower than other proposed systems, enabling the operating company to provide superior entainment at substantially lower cost.

As has been indicated above, the illustrated embodiments of my invention are not to limit the scope thereof. On the contrary, I desire that the scope of the invention be determined by the following claims.

What is claimed is:

1. In a scrambled television system having a transmitter and at least one receiver and of a type wherein signals for reconstructing the program at the receiver are transmitted in one of two or more modes, which mode is changed from time to time according to a code plan, decoding circuits at the receiver, means for controlling decoding circuits at the receiver to cause said decoding circuits to change in relation to changes of mode of the signals in the transmission, said means including means at the transmitter responsive to a plurality of signals each changing in amplitude from time to time for generating a different code control signal for representation of different modes, means for generating said changing signals, summation means selectively connectable to sum at least certain of said changing signals for providing a code pattern signal, means responsive at least in part to said code pattern signal for controlling the mode of the transmitted signal, means for conveying said code control signal to the receiver, and means at the receiver for selectively responding to the different code control signals to control mode resolution at the receiver.

2. A system as in claim 1 wherein the changing signal generating means includes means for maintaining the generation of a given code control signal representative of a given mode for the duration of the given mode.

3. In a scrambled television system having a transmitter and at least one receiver and of the type wherein signals for reconstructing the program in the receiver are transmitted in one of two or more modes, which modes are changed from time to time according to a code plan, means for controlling decoding circuits at the receiver to cause same to change in relation to changes of mode of said transmitted signals, said means including means at the transmitter responsive to a plurality of signals each changing in amplitude from time to time for generating a different code control signal for different modes, means for generating said changing signals, summation means selectively connectable to sum at least certain of said changing signals for providing a code pattern signal, means responsive at least in part to said code pattern signal for controlling the mode of the transmitted signal, means for conveying said code control signal to the receiver, and means at the receiver for selectively responding to said different code control signals to control mode resolution, the last mentioned means including means responsive to said code control signals and having portions differently connectable for each one of a plurality of possible code plans, the arrangement being such that decoding at the receiver is incomplete unless the differently connectable means are connected according to a given code plan on information obtained independently of the system.

4. A system as in claim 3 wherein the means responsive to said code control signals includes a matrix circuit having a plurality of terminals for contacting printed code circuits on a replaceable record card for establishing said differently connectable portions upon insertion of said card to contact said terminals.

5. A system as in claim 3 wherein the means responsive to said code control signals includes means operable by a code configuration on a replaceable record card to establish said differently connectable portions.

6. A system as in claim 5 wherein the code configuration carried by the record card comprises printed circuits.

7. A scrambled television system having a transmitter and at least one receiver and of the type where video signals are transmitted in one of two or more modes, which modes are changed from time to time according to a code plan, means for controlling decoding circuits at the receiver to change with changes of mode of the video signals in the transmission, said means including means at the transmitter for generating two or more binary coded control signals forming a code group, the transmitter including summation means responsive to said binary signals for at least partially determining and establishing a predetermined mode of video signal transmission, means for transmitting a group of on-off binary coded distinguishable code control frequencies to the receiver, the receiver including means for detecting the transmitted ones of said binary coded signals in separate channels, the receiver further including means for detecting the transmitted video signals, and means responsive to the detected video signals and the detected binary code control signals for resolving the mode of video transmission.

8. A system as in claim 7 wherein the receiver means further includes matrix means having portions differently connectable for each one of a plurality of possible code plans, the arrangement being such that transmitted code control signal groups may properly resolve the mode of video transmission only when the differently connectable means of the matrix means are connected according to a code plan utilized at the time.

9. A system as in claim 7 wherein the means at the receiver for selectively responding to the different code control signals includes a plurality of band pass filter circuits, one tuned to each of said distinguishable signals of different frequency for generating mode indication signals for mode resolution at the receiver.

10. A replaceable element for a scrambled television system of the type having a transmitter and at least one receiver and wherein at least one component of the television signals for reconstructing a picture in the receiver is transmitted in one of two or more modes which are changed from time to time according to a code plan, and decoding is completed by injection of independently derived decoding information at the receiver, the element having coded means thereon for completing electrical circuits, and means secured to said element and obscuring at least certain areas thereof for preventing detection of the code related to said coded means.

11. A replaceable element for a scrambled television system of the type having a transmitter and at least one receiver and wherein decoding is completed by injection of independently derived decoding information at the receiver, the element having at least one printed code circuit thereon forming said independent decoding information, and means secured to said element and obscuring at least a part of said one printed circuit for preventing detection of the code related to said printed circuit.

12. Decoding circuitry for use as part of a receiver in a system wherein standard synchronizing signals are transmitted along with video signals in one of two or more modes and different code control signals, the decoding circuitry comprising means for generating a different mode indication signal including a plurality of signal components upon detection of given ones of the possible transmitted code control signals, means for generating a plurality of mode resolution signals based upon the standard synchronizing signals detected at the receiver, and matrix means including means for selectively summing the signal components within each different mode indication signal and having a first input connected with said mode indication signal generating means and a second input connected with said mode resolution generating means for resolving the existing mode in the receiver display at least partially in accordance with the sum of said signal components during given intervals of time, the matrix means including changeable portions for causing at least the selectivity as between the summing of said signal components, the arrangement being such that the changeable portions of the matrix may be set according to the code plan in operation at the transmitter, to interpret an existing detected mode control signal from the transmitter to correctly control the receiver display.

13. A system as in claim 12 wherein the matrix means includes means for insertion thereinto of a replaceable element and wherein said changeable portions includes a replaceable element inserted in said insertion means and bearing a code configuration for completing the matrix means according to said code plan.

14. A system as in claim 13 wherein the replaceable element is a record card having at least one printed circuit thereon forming said code configuration, said printed circuit serving to electrically complete the matrix means at least in part.

15. A decoding circuit for a scrambled television system having a transmitter and at least one receiver and of a type wherein video signals are transmitted and received in one of two or more modes together with synchronizing signals and a code control signal which is different for different ones of the possible modes, the code control signal being a group of signals representing one combination of $n$ possible combinations, the decoder including means responsive to detected groups of signals for establishing mode indicating signals in related combinations in two or more channels, means for generating a plurality of mode resolution signals in two or more channels, one for each possible mode, a matrix means including means for summing said mode indicating signals and having first inputs connected with said mode indicating channels and having second inputs connected with said mode resolution channels, the matrix having changeable portions for determining which of the mode indicating signals is to be summed and for relating the mode indicating signals to the mode resolving signals in keeping with the current one of a number of possible code plans in use for driving the receiver display to show a proper image.

16. A scrambled signal transmission system having sending equipment and at least one receiving equipment and including means for conveying intelligence signals from the sending equipment to the receiving equipment in one of two or more discrete modes changeable from time to time at sufficiently short time periods to render unintelligible the output of unauthorized receiving equipment, and means including a plurality of stationary terminals in the receiving equipment for resolving the intelligence signal modes to reconstruct a message from said signals, said resolving means further including a stationarily disposed readily replaceable business machine record card having at least partially obscured electrically conductive circuits therein with at least some of the unobscured parts of said circuits being in contact with at least certain of said terminals for completing predetermined electrical circuits in said receiving equipment for said mode resolving purpose.

17. In receiving equipment for a scrambled signalling system having sending equipment and at least one receiving equipment and including means for conveying intelligence signals from the sending equipment to the receiving equipment in one of two or more discrete modes which are changed from time to time at sufficiently short time periods to render unintelligible the output of unauthorized receiving equipment; decoding means including a plurality of stationary terminals for making an unauthorized receiving equipment authorized by resolving the intelligence signal modes to reconstruct a message from said signals, said decoding means further including a stationarily disposed readily replaceable business machine record card having at least partially obscured electrically conductive circuits therein with at least some of the unobscured parts of said circuits being in contact with at least certain of said terminals for completing predetermined electrical circuits in said decoding means for said mode resolving purpose and thereby rendering the output of the authorized receiving equipment completely intelligible.

18. An encoding arrangement for a subscription television system comprising: encoding apparatus having a plurality of operating conditions for establishing a corresponding plurality of operating modes in said television system; a control mechanism coupled to said encoding apparatus and responsive to an applied signal for selectively actuating said encoding apparatus between its aforesaid operating conditions; means for developing during a first mode-determining interval a first combination of signal components representing a first pattern and during a second and succeeding mode-determining interval a second combination of signal components representing a second pattern; and means for utilizing signal components of at least said first combination to effect actuation of said control mechanism thereby to establish said encoding apparatus throughout an interval succeeding said first mode-determining interval in one of its operating conditions determined by at least said first pattern, and for utilizing said signal components of said second combination to effect actuation of said control mechanism for establishing said encoding apparatus throughout an interval succeeding both said first and second mode-determining intervals in one of its operating conditions conjointly determined by at least said first and second patterns.

19. In a subscription television system for translating a television signal including video-signal components in recurring trace intervals and synchronizing-signal components in intervening retrace intervals: encoding apparatus having a plurality of operating conditions for establishing a corresponding plurality of operating modes in said television system; a control mechanism coupled to said encoding apparatus and responsive to an applied signal for selectively actuating said encoding apparatus between its aforesaid operating conditions; means for developing during a first one of said retrace intervals a first combination of signal components representing a first pattern and during a second and succeeding one of said retrace intervals a second combination of signal components representing a second pattern; and means for utilizing signal components of at least said first combination to effect actuation of said control mechanism thereby to establish said encoding apparatus throughout at least a portion of a trace interval succeeding said first retrace interval in one of its operating conditions determined by at least said first pattern, and for utilizing said signal components of said second combination to effect actuation of said control mechanism for establishing said encoding apparatus throughout at least a portion of a trace interval succeeding both said first and second retrace intervals in one of its operating conditions conjointly determined by at least said first and second patterns.

20. In a subscription television system for translating a television signal including video-signal components in recurring field-trace intervals and synchronizing-signal components in intervening field-retrace intervals: encoding apparatus having a plurality of operating conditions for establishing a corresponding plurality of operating modes in said television system; a control mechanism coupled to said encoding apparatus and responsive to an applied signal for selectively actuating said encoding apparatus between its aforesaid operating conditions; means for developing during a first one of said field-retrace intervals a first combination of signal components representing a first pattern and during a second and succeeding field-retrace interval a second combination of signal components representing a second pattern; and means for utilizing signal components of at least said first combination to effect actuation of said control mechanism thereby to establish said encoding apparatus throughout at least a portion of a field-trace interval immediately succeeding said first field-retrace interval in one of its operating conditions determined by at least said first pattern, and for utilizing said signal components of said second combination to effect actuation of said control mechanism for establishing said encoding apparatus throughout at least a portion of a field-trace interval immediately succeeding said second field-retrace interval in one of its operating conditions conjointly determined by at least said first and second patterns.

21. A coding arrangement for a subscription television transmitter comprising: coding apparatus having a plurality of operating conditions for establishing a corresponding plurality of operating modes in said television transmitter; a control mechanism coupled to said coding apparatus and responsive to an applied signal for selectively actuating said coding apparatus between its aforesaid operating conditions; means for developing during a first mode-determining interval a first combination of signal components representing a first pattern and during a second and succeeding mode-determining interval a second combination of signal components representing a second pattern; and means for utilizing signal components of at least said first combination to effect actuation of said control mechanism thereby to establish said coding apparatus throughout an interval succeeding said first-mode-determining interval in one of its operating conditions determined by at least said first pattern, and for utilizing said signal components of said second combination to effect actuation of said control mechanism for establishing said coding apparatus throughout an interval succeeding both said first and second mode-determining intervals in one of its operating conditions conjointly determined by at least said first and second patterns.

22. A method of encoding a television signal comprising the steps of: developing during a first mode-determining interval a first group of signal components representing a first pattern; utilizing signal components of at least said first group to establish said television signal throughout an interval succeeding said first-mode determining interval in an operating mode determined by at least said first pattern; developing during a second and succeeding mode-determining interval a second group of signal components representing a predetermined second pattern; and utilizing said signal components of said second group to establish said television signal throughout an interval succeeding both said first and second mode-determining intervals in an operating mode conjointly determined by at least said first and second patterns.

References Cited by the Examiner

UNITED STATES PATENTS

| | | | |
|---|---|---|---|
| 2,251,525 | 8/1941 | Rosenthal | 178—5.1 |
| 2,402,058 | 6/1946 | Loughren | 178—5.1 X |
| 2,414,101 | 1/1947 | Hogan | 178—5.1 |
| 2,484,642 | 11/1949 | Paris | 235—61.12 |
| 2,501,274 | 3/1950 | Hamilton. | |
| 2,510,046 | 5/1950 | Ellett et al. | 178—5.1 |
| 2,547,598 | 4/1951 | Roschke | 178—5.1 |
| 2,646,406 | 10/1953 | Gray et al. | 178—5.1 |
| 2,646,407 | 10/1953 | Herrick et al. | 178—5.1 |
| 2,753,393 | 7/1956 | Pawley et al. | 178—5.1 |
| 2,757,226 | 7/1956 | Zworykin | 178—5.1 |
| 2,769,024 | 10/1956 | Del Riccio et al. | 178—5.1 |
| 2,843,656 | 7/1958 | Morris | 178—5.1 |
| 2,977,434 | 3/1961 | Shanahan | 178—5.1 X |

FOREIGN PATENTS 986,834   4/1951   France.

DAVID G. REDINBAUGH, Primary Examiner.

IRVING L. SRAGOW, ROBERT H. ROSE, NEWTON N. LOVEWELL, STEPHEN W. CAPELLI, E. JAMES SAX, Examiners.

A. SOPP, J. E. HAWES, R. M. HESSIN, H. W. BRITTON, Assistant Examiners.